(12) United States Patent
Manley

(10) Patent No.: US 7,478,101 B1
(45) Date of Patent: Jan. 13, 2009

(54) SYSTEM-INDEPENDENT DATA FORMAT IN A MIRRORED STORAGE SYSTEM ENVIRONMENT AND METHOD FOR USING THE SAME

(75) Inventor: Stephen L. Manley, Pleasanton, CA (US)

(73) Assignee: Networks Appliance, Inc., Sunnyvale, CA (US)

( * ) Notice: Subject to any disclaimer, the term of this patent is extended or adjusted under 35 U.S.C. 154(b) by 411 days.

(21) Appl. No.: 10/777,978

(22) Filed: Feb. 12, 2004

Related U.S. Application Data

(60) Provisional application No. 60/532,037, filed on Dec. 23, 2003.

(51) Int. Cl.
*G06F 17/30* (2006.01)
(52) U.S. Cl. ..................................................... 707/100
(58) Field of Classification Search ..................... 707/1, 707/2, 9, 10, 100; 797/10; 709/224; 370/537; 713/183; 717/169
See application file for complete search history.

(56) References Cited

U.S. PATENT DOCUMENTS

| | | |
|---|---|---|
| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,124,987 A | 6/1992 | Milligan et al. |
| RE34,100 E | 10/1992 | Hartness |
| 5,155,835 A | 10/1992 | Belsan |
| 5,163,131 A | 11/1992 | Row et al. |
| 5,202,979 A | 4/1993 | Hillis et al. |
| 5,278,979 A | 1/1994 | Foster et al. |
| 5,403,667 A | 4/1995 | Simoens |

(Continued)

FOREIGN PATENT DOCUMENTS

WO      WO 89/10594      11/1989

OTHER PUBLICATIONS

Basilico, et al., *Error Correction System Using "Shadow Memory"*, IBM Technical Disclosure Bulletin, May 1984, pp. 5792-5793.

(Continued)

*Primary Examiner*—Etienne P LeRoux
(74) *Attorney, Agent, or Firm*—Cesari and McKenna LLP

(57) ABSTRACT

A system for transmitting replica data between a source system and a destination system provides various standalone headers and data following headers that identify aspects of the data stream in a generalized manner. On the destination storage system, a set of hidden metadata directories ("metadirs") are provided for storing extended attributes in association with files on the destination. The system also supports a standalone header that instructs the destination to undo a backed-up changed file in the event that the source determines that the file was modified in the midst of a backup procedure and transmission to the destination.

68 Claims, 16 Drawing Sheets

U.S. PATENT DOCUMENTS

| | | | |
|---|---|---|---|
| 5,426,747 | A | 6/1995 | Weinreb et al. |
| 5,568,629 | A | 10/1996 | Gentry et al. |
| 5,581,724 | A | 12/1996 | Belsan et al. |
| 5,596,706 | A * | 1/1997 | Shimazaki et al. ............. 714/6 |
| 5,819,292 | A | 10/1998 | Hitz et al. |
| 6,061,770 | A | 5/2000 | Franklin |
| 6,081,875 | A | 6/2000 | Clifton et al. |
| 6,341,341 | B1 | 1/2002 | Grummon et al. |
| 6,353,829 | B1* | 3/2002 | Koblenz et al. ............. 707/100 |
| 6,490,722 | B1* | 12/2002 | Barton et al. ............... 717/174 |
| 6,516,380 | B2 | 2/2003 | Kenchammana-Hoskote et al. |
| 6,574,591 | B1 | 6/2003 | Kleiman et al. |
| 6,604,118 | B2 | 8/2003 | Kleiman et al. |
| 6,636,879 | B1 | 10/2003 | Doucette et al. |
| 6,643,654 | B1 | 11/2003 | Patel et al. |
| 6,993,539 | B2 | 1/2006 | Federwisch et al. |
| 7,007,046 | B2 | 2/2006 | Manley et al. |
| 7,010,553 | B2 | 3/2006 | Chen et al. |
| 7,043,485 | B2 | 5/2006 | Manley et al. |
| 7,107,385 | B2 | 9/2006 | Rajan et al. |
| 7,127,577 | B2 | 10/2006 | Koning et al. |
| 7,194,597 | B2 | 3/2007 | Willis et al. |
| 7,225,204 | B2 | 5/2007 | Manley et al. |
| 7,386,546 | B1 | 6/2008 | Santry et al. |
| 2001/0001877 | A1* | 5/2001 | French et al. ............... 713/182 |
| 2002/0083037 | A1 | 6/2002 | Lewis et al. |
| 2003/0066062 | A1* | 4/2003 | Brannock et al. ........... 717/169 |
| 2004/0022278 | A1* | 2/2004 | Thomas et al. .............. 370/537 |
| 2004/0030668 | A1 | 2/2004 | Pawlowski |
| 2005/0246401 | A1 | 11/2005 | Edwards et al. |
| 2007/0088702 | A1 | 4/2007 | Fridella et al. |

OTHER PUBLICATIONS

Bitton, Dina, *Disk Shadowing*, Proceedings of the 14th VLDB Conference, LA, CA (1988).

Blasgen, M.W. et al., *System R: An architectural Overview*, Reprinted from IBM Systems Journal vol. 20, No. 1, 1981 ©1981, 1999.

Borenstein, Nathaniel S., *CMU's Andrew project a retrospective*, Communications of ACM, (39) 12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl* 5890 Performance Evaluation, pp. 74-85, 1990.

Chutani, Sailesh, et al., *The Episode file system*, In Proceedings of the USENIX Winter 1992.

Clarke, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglas, Fred, et al., *A comparison of two distributed systems: Amoeba and Sprite* - Computing Systems, 4(4), Fall 1991, pp. 353-385 ?(copy of article I have has no date or cite).

Gait, Jason, *Phoenix: A Safe In-Memory File System.* Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994, pp. 1-23.

Hitz, David, et al. *System and Method for Enabling a Storage System to Support Multiple Volume Formats Simultaneously*, USPTO Provisional Patent U.S. Appl. No. 60/652,626. Feb. 14, 2005.

Howard, John H, et al. *Scale and Performance in a Distributed File System*, Carnegie Mellon University, CMU-ITC-87-068, Aug. 5, 1987.

Howard, John, H. et al.,*Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lorie, Raymound, A, *Physical integrity in a large segmented database*, ACM Trans. Database Systems, (2)1: 91-104, Mar. 1977.

Lorie, Ra, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *Rama: A File System for Massively Parallel Computers*, 12th IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington), Published as Operating Systems Review, 19(5):51-62, Dec. 1985.

Muller, Keith, et al., *A High Performance Multi-Structured File System Design*, In Proceedings of the 13th ACM Symposium on Operating Systems Princples, Oct. 1991, pp. 56-67.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkely, Oct. 30, 1988.

Ousterhout, John, *Why Aren't Operating Systems Getting Faster as Fast as Hardware?*, Digital WRL Technical Note TN-11, Oct. 1989.

Patterson, D., et al., *A Case for Redundant Arrays of Inexpensive Disks (RAID)*, _Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, _SIGMOD International Conference on Management of Data, Chicago, IL, USA, Jun. 1-3, 1988, SIGMOD RECORD (17)3:109-116 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And. Computer Sciences, Univ. of CA, presented at Summer '90 USENIX Technical Conference, Anaheim, CA Jun. 1990.

Rosenblum, Mendel, et al., The *Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al, *Design and implementation of the Sun Network Filesystem*. In Proc. Summer 1985 USENIX Conf., pp. 119--130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan, .M . . *A survey of distributed file-systems*. Annual Review of Computing Science, 4(73--104), 1989.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *Laddis: The next generation in NFS file server benchmarking*, USENIX Association Conference Proceedings, Apr. 1993.

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14th VLDB Conference, LA, CA 1988.

Chaudhuri, Surajit, et al., *Self-Tuning Technology in Microsoft SQL Server*, Data Engineering Journal 22, Feb. 1999 pp. 20-27.

Chutani, Sailesh, et al., *The Episode File System*, In Proceedings of the USENIX Winter 1992.

Coyne, Robert A., et al., *Storage Systems for National Information Assests*, Proc. Supercomputing 92, Minneapolis, Nov. 1992, pp. 626-633.

Finlayson, Ross S., et al., *Log Files: An Extended File Service Exploiting Write-Once Storage* Department on Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITX-88-062 1988.

Howard, John, H. et al., *Scale and Performance in a Distributed File System*, ACM Trans. Computer System, 6(1), Feb. 1988 pp. 51-81.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal Feb. 22, 1999 pp. 33-40.

Kent, Jack et al., *Optimizing Shadow Recovery Algorithms, IEEE Transactions on Software Engineering*, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst,m vol. 2, Mar. 1997, pp. 91-104.

Ousterhout, John et al., *Beating the I/O Bottleneck: A Case for Log-Structured File Systems*, Technical Report. Computer Science Division, Electrical Engineering and Computer Sciences, University of California at Berkeley, Oct. 30, 1988.

Patterson, D., et al., *A Case for Redundant Arrays of Inexpensive Disks (RAID)*, _Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD RECORD (17)3:109-16 Sep. 1988.

Peterson, Zachary Nathaniel Joseph$_1$ *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, 2 1999 pp. 28-32.

Weikum, Gerhard, et al., *Towards Self-Tuning Memory Management for Data Servers*, Data Engineering Journal 22, 2 1999 pp. 3-11.

West, Michael, et al., *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

\* cited by examiner

SYSTEM-INDEPENDENT DATA FORMAT IN A MIRRORED STORAGE SYSTEM ENVIRONMENT AND METHOD FOR USING THE SAME

RELATED APPLICATIONS

This application claims the benefit of U.S. Provisional Application Ser. No. 60/532,037, filed Dec. 23, 2003 entitled SYSTEM-INDEPENDENT DATA FORMAT IN A MIRRORED STORAGE SYSTEM ENVIRONMENT AND METHOD FOR USING THE SAME, by Stephen L. Manley, the teachings of which are expressly incorporated by reference.

This application is related to the following United States Patent Applications:

Ser. No. 10/100,950, entitled SYSTEM AND METHOD FOR ASYNCHRONOUS MIRRORING OF SNAPSHOTS AT A DESTINATION USING A PURGATORY DIRECTORY AND INODE MAPPING, by Stephen L. Manley, et al., the teachings of which are expressly incorporated herein by reference;

Ser. No. 10/100,945, entitled SYSTEM AND METHOD FOR STORAGE OF SNAPHOT METADATA IN A REMOTE FILE, by Stephen L. Manley, et al., the teachings of which are expressly incorporated herein by reference;

Ser. No. 10/100,434, entitled SYSTEM AND METHOD FOR REDIRECTING ACCESS TO A REMOTE MIRRORED SNAPSHOT, by Raymond C. Chen, et al., the teachings of which are expressly incorporated herein by reference;

Ser. No. 10/100,879, entitled FORMAT FOR TRANSMISSION OF FILE SYSTEM INFORMATION BETWEEN A SOURCE AND A DESTINATION, by Stephen L. Manley, et al., the teachings of which are expressly incorporated herein by reference; and Ser. No. 10/100,967, entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al., the teachings of which are expressly incorporated herein by reference.

FIELD OF THE INVENTION

This invention relates to asynchronous mirroring or replication of data, and more particularly the transmission of data from a source system to a destination system that may utilize differing platform architectures, file systems and/or protocols.

BACKGROUND OF THE INVENTION

A storage appliance is a computer that provides file service relating to the organization of information on storage devices, such as disks. The file server (or filer) includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public net-work such as the Internet. Each client may request the services of the file system on the filer by issuing file system protocol messages (in the form of packets) to the filer over the network.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service re-quests from network-attached clients.

As used herein, the term "storage operating system" generally refers to the computer-executable code operable on a computer that manages data access and may, in the case of a storage appliance, implement file system semantics, such as the Data ONTAP™ storage operating system that is implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

In order to improve reliability and facilitate disaster recovery in the event of a failure of a filer, its associated disks or some portion of the storage infrastructure, it is common to "mirror" or replicate some or all of the underlying data and/or the file system that organizes the data. In one example, a mirror is established and stored at a remote site, making it more likely that recovery is possible in the event of a true disaster that may physically damage the main storage location or it's infrastructure (e.g. a flood, power outage, act of war, etc.). The mirror is updated at regular intervals, typically set by an administrator, in an effort to catch the most recent changes to the file system. One common form of update involves the use of a Snapshot™ process.

Snapshotting is further described in TR3002 File System Design for an NFS File Server Appliance by David Hitz et al., published by Network Appliance, Inc., and in U.S. Pat. No. 5,819,292 METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference. The term "Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other unique identifier that distinguishes it from other PCPIs taken at other points in time. A PCPI can also include other information (metadata) about the active file system at the particular point in time for which the image is taken. Note that the terms "PCPI" and "Snapshot™" may be used interchangeably throughout this patent without derogation of Network Appliance's trademark rights.

By way of background, a snapshot or PCPI is a restorable version of a file system created at a predetermined point in time. PCPIs are generally created on some regular schedule. The PCPI is stored on-disk along with the active file system, and is called into the buffer cache of the storage appliance memory as requested by the storage operating system. An exemplary file system data identifier buffer tree structure (using inodes in this example-but other forms of block and data identifiers can be employed) 100 is shown in FIG. 1. Over the exemplary tree structure may reside a file system information block (not shown). The root inode 105 contains information describing the inode file associated with a given file system. In this exemplary file system inode structure root inode 105 contains a pointer to the inode file indirect block 110. The inode file indirect block 110 contains a set of pointers to inode file and data blocks 115. The inode file data block 115 includes pointers to file and data blocks to 120A, 120B and 120C. Each of the file data blocks 120(A-C) is capable of storing, in the illustrative embodiment, 4 kilo-bytes (KB) of data. Note that this structure 100 is simplified, and that additional layers of data identifiers can be provided in the buffer tree between the data blocks and the root inode as appropriate.

When the file system generates a PCPI of a given file system, a PCPI inode 205 is generated as shown in FIG. 2. The PCPI inode 205 is, in essence, a duplicate copy of the root inode 105 of the data structure (file system) 100. Thus, the exemplary structure 200 includes the same inode file indirect block 110, inode file data block(s) 115 and file data blocks 120A-C as in FIG. 1. When a user modifies a file data block, the file system layer writes the new data block to disk and changes the active file system to point to the newly created block.

FIG. 3 shows an exemplary data structure 300 after a file data block has been modified. In this illustrative example, file data block 120C was modified to file data block 120C'. When file data block 120C is modified file data block 120C', the contents of the modified file data block are written to a new location on disk as a function for the exemplary file system. Because of this new location, the inode file data block 315 pointing to the revised file data block 120C must be modified to reflect the new location of the file data block 120C. Similarly, the inode file indirect block 310 must be rewritten to point to the newly revised inode file and data block. Thus, after a file data block has been modified the PCPI inode 205 contains a point to the original inode file system indirect block 110 which in turn contains a link to the inode file data block 115. This inode file data block 115 contains pointers to the original file data blocks 120A, 120B and 120C. However, the newly written inode file data block 315 includes pointers to unmodified file data blocks 120A and 120B. The inode file data block 315 also contains a pointer to the modified file data block 120C' representing the new arrangement of the active file system. A new file system root inode 305 is established representing the new structure 300. Note that metadata (not shown) stored in any Snapshotted blocks (e.g., 205, 110, and 120C) protects these blocks from being recycled or overwritten until they are released from all PCPIs. Thus, while the active file system root inode 305 points to new blocks 310, 315 and 120C', the old blocks 205, 110, 115 and 120C are retained until the PCPI is fully released.

After a PCPI has been created and file data blocks modified, the file system layer can reconstruct or "restore" the file system inode structure as it existed at the time of the snapshot by accessing the PCPI inode. By following the pointers contained in the PCPI inode 205 through the inode file indirect block 110 and inode file data block 115 to the unmodified file data blocks 120A-C, the file system layer can reconstruct the file system as it existed at the time of creation of the snapshot.

In mirroring, the above-described PCPI is transmitted as a whole, over a network (such as the well-known Internet) to the remote storage site. Generally, a PCPI is an image (typically read-only) of a file system at a point in time, which is stored on the same primary storage device as is the active file system and is accessible by users of the active file system. Note, that by "active file system" it is meant the file system to which current input/output (I/O) operations are being directed. The primary storage device, e.g., a set of disks, stores the active file system, while a secondary storage, e.g. a tape drive, may be utilized to store backups of the active file system. Once Snapshotted, the active file system is reestablished, leaving the imaged version in place for possible disaster recovery. Each time a PCPI occurs, the old active file system becomes the new PCPI, and the new active file system carries on, recording any new changes. A set number of PCPIs may be retained depending upon various time-based and other criteria. The PCPI process is described in further detail in U.S. patent application Ser. No. 09/932,578, entitled INSTANT SNAPSHOT by Blake Lewis et al., which is hereby incorporated by reference as though fully set forth herein.

The complete recopying of the entire file system to a remote (destination) site over a network may be quite inconvenient where the size of the file system is measured in tens or hundreds of gigabytes (even terabytes). This full-backup approach to remote data mirroring or replication may severely tax the bandwidth of the network and also the processing capabilities of both the destination and source filer. One solution has been to limit the replica to only portions of a file system volume that have experienced changes. Hence, FIG. 4 shows volume-based mirroring/replication procedure where a source file system 400 is connected to a destination storage site 402 (consisting of a server and attached storage—not shown) via a network link 404. The destination 402 receives periodic mirror/replica updates at some regular interval set by an administrator. These intervals are chosen based upon a variety of criteria including available bandwidth, importance of the data, frequency of changes and overall volume size.

In brief summary, the source creates a pair of discrete time-separated PCPIs of the volume. These can be created as part of the commit process in which data is committed to non-volatile memory in the filer or by another mechanism. The "new" PCPI 410 is a recent PCPI of the volume's active file system. The "old" PCPI 412 is an older PCPI of the volume, which should match the image of the file system mirrored/replicated on the destination mirror. Note that the file server is free to continue work on new file service requests once the new PCPI 412 is made. The new PCPI acts as a checkpoint of activity up to that time rather than an absolute representation of the then-current volume state. A differencer 420 scans the blocks 422 in the old and new PCPIs. In particular, the differencer works in a block-by-block fashion, examining the list of blocks in each PCPI to compare which blocks have been allocated. In the case of a write-anywhere system, the block is not reused as long as a PCPI references it, thus a change in data is written to a new block. Where a change is identified (denoted by a presence or absence of an 'X' designating data), a decision process 400, shown in FIG. 5, in the differencer 420 decides whether to transmit the data to the destination 402. The decision process 500 compares the old and new blocks as follows: (a) where data is in neither an old nor new block (case 502) as in old/new block pair 430, no data is available to transfer; (b) where data is in the old block, but not the new (case 504) as in old/new block pair 432, such data has already been transferred, (and any new destination PCPI pointers will ignore it), so the new block state is not transmitted; (c) where data is present in the both the old block and the new block (case 506) as in the old/new block pair 434, no change has occurred and the block data has already been transferred in a previous PCPI; and (d) finally, where the data is not in the old block, but is in the new block (case 508) as in old/new block pair 436, then a changed data block is transferred over the network to become part of the changed volume mirror/replica set 440 at the destination as a changed block 442. In the exemplary write-anywhere arrangement, the changed blocks are written to new, unused locations in the storage array. Once all changed blocks are written, a base file system information block, that is the root pointer of the new PCPI, is then committed to the destination. The transmitted file system information block is committed, and updates the overall destination file system by pointing to the changed block structure in the destination, and replacing the previous file system information block. The changes are at this point committed as the latest incremental update of the destination volume mirror. This file system accurately represents the "new" mirror on the source. In time a new "new" mirror is created from further incremental changes.

Approaches to volume-based remote mirroring of PCPIs are described in detail in commonly owned U.S. patent application Ser. No. 09/127,497, entitled FILE SYSTEM IMAGE TRANSFER by Steven Kleiman, et al. and U.S. patent application Ser. No. 09/426,409, entitled FILE SYSTEM IMAGE TRANSFER BETWEEN DISSIMILAR FILE SYSTEMS by Steven Kleiman, et al., both of which are expressly incorporated herein by reference.

This volume-based approach to incremental mirroring from a source to a remote storage destination is effective, but in some circumstances it may be desirable to replicate less than an entire volume structure. The volume-based approach typically forces an entire volume to be scanned for changes and those changes to be transmitted on a block-by-block basis. In other words, the scan focuses on blocks without regard to any underlying information about the files, inodes and data structures, which the blocks comprise. The destination is organized as a set of volumes so a direct volume-by-volume mapping is established between source and destination. Where a volume may contain a terabyte or more of information, the block-by-block approach to scanning and comparing changes may still involve significant processor overhead and associated processing time. Often, there may have been only minor changes in a sub-block beneath the root inode block being scanned. Since a list of all blocks in the volume is being examined, however, the fact that many groupings of blocks (files, inode structures, etc.) are unchanged is not considered. In addition, the increasingly large size and scope of a full volume make it highly desirable to sub-divide the data being mirrored into sub-groups such as qtrees, because some groups are more likely to undergo frequent changes, it may be desirable to update their PCPIs/Snapshots™ more often than other, less-frequently changed groups. In addition, it may be desirable to mingle original and imaged (Snapshotted) sub-groups in a single volume and migrate certain key data to remote locations without migrating an entire volume.

One such sub-organization of a volume is the well-known qtree. Qtrees, as implemented on an exemplary storage system such as described herein, are subtrees in a volume's file system. One key feature of qtrees is that, given a particular qtree, any file or directory in the system can be quickly tested for membership in that qtree, so they serve as a good way to organize the file system into discrete data sets. The use of qtrees as a source and destination for replicated data may be desirable. An approach to remote asynchronous mirroring of a qtree is described in U.S. patent application Ser. No. 10/100,967 entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al., the teachings of which are incorporated herein by reference.

However, the use of qtrees, snapshot comparisons and volume implementation specific details on the source of a mirroring/replication data backup system requires that both the source and destination utilize the same or otherwise compatible file systems. In a modern heterogeneous network environment, the network may comprise of a variety of differing computer architectures including, for example, Windows 2000® computers, various versions of the Unix™ operating system, Linux or other operating systems. Each of these various operating systems may not support qtrees or other sub-volume characteristics.

It is desirous to provide an incremental backup/replication system and method that is operating system (OS) and file system (FS) independent. This OS and FS independence will enable the backup system to operate in modern heterogeneous networking environments. As these various operating systems may not support the file system sub-volume characteristics utilized by the storage system acting as a remote backup destination, conventional block-by-block or snapshot comparison techniques may not be utilized.

In implementing a system-independent arrangement for backing up data over a network between a source server and a destination backing store, the data format employed to transmit the information between the source and destination is of particular concern. The format should allow for efficient transmission of all needed information, including that required to properly manage a plurality of PCPIs that may need to be restored at a later time. On occasion, such transmissions may be interrupted or fail to complete. The format should be able to deal with partial transmissions where restarts of transmission are needed. The format should also allow the destination to quickly ascertain the nature of data being transmitted (e.g. files, directories, raw data or data handling instructions). The above-incorporated FORMAT FOR TRANSMISSION OF FILE SYSTEM INFORMATION BETWEEN A SOURCE AND A DESTINATION (described below) provides a format that is particularly suited for transmission of asynchronous mirrors of a data set from a source server to a destination backing store. While this format is highly effective in facilitating efficient and robust transmission of data, it can be improved by further adapting it to accommodate a variety of different source and destination system environments. For example, a format that enables a source having a one manufacturer's operating system (open source Linux, for example) to backup data to a destination running another manufacturers operating system (Data Ontap™, for example). Likewise, this format should be able to support not only file and directory-level storage hierarchies, but block-based storage hierarchies as well.

In addition, when a source may use unique attributes to characterize its data, these attributes may not be properly accounted for by the destination system. A technique for transmitting and handling such attributes is highly desirable. The attributes should be stored on the destination system so that they remain intact if and when restored to the source. Likewise, these attributes should remain appropriately hidden while stored on the destination system.

SUMMARY OF THE INVENTION

The disadvantages of the prior art are overcome by providing a data format for transmitting replica data between a source system and a destination system by providing various standalone headers and data following headers that identify aspects of the data stream in a generalized manner. More particularly, the stream is structured to abstract common metadata into a standard format, while enabling system-specific metadata to be easily attached to data in the stream. The stream also provides for extensibility and version independence by allowing new or unknown metadata to be treated as opaque information that is stored without further processing. The stream is built of headers, metadata and data. For any one file, the stream allows including headers and metadata that contain extended attribute field in which a number of different platform/operating system-specific attributes (e.g. ACLs, streams, etc.) are identified and associated with particular named files in the data stream. The headers include space in which the extended attribute can further define itself, for example, by storing a name or other attribute-specific information.

On the destination storage system, a set of hidden metadata directories ("metadirs") are provided for storing non-system supported extended attributes in association with any and all files on the destination. The extended attributes are appended to each file, as applicable, via an NT steam. The metadir set contains (a) a permanent metadir which stores active copies of the files, available for restoration to the source; (b) a purgatory metadir, to which the files and streams of the permanent metadir are transferred when the source sends a new set of attributes for those files during an update and (c) a new metadir to which changed files with new extended attributes, if any, are written. When the new metadir is fully populated with changes, it is integrated into the permanent metadir and becomes the new permanent copy, and the purgatory metadir is eliminated. If the update is interrupted, the purgatory directory is re-integrated into the permanent metadir with the older/original versions of the files and their stream-appended extensions. When restoring files that contain non-system supported attributes, the destination simply traverses the permanent metadir to find the requested files and transmits them back to the source with appropriate stream-appended attributes using the extended attribute format. This metadir approach can also be used to store entire files, not just the extended attributes. If there is a security risk in maintaining a user-visible replica, or if the file is of a type not supported by the replication destination, entire files can be stored in the hidden space. Those files can then be replicated and protected, but available only for restoration by a qualified, secure process setup by the administrator.

The format also supports a standalone header to handle bypassing files that have been modified on the source while replicating changes. Files that change while being read are often considered to be useless on a replica. As such, the source can instruct the destination to undo a backed-up changed file in the event that the source determines that the file was modified in the midst of the procedure. This ensures that a coherent version of the file is stored on the destination, rather than a version that may have been corrupted by a partially completed modification.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Source and Destination Storage System Environment

Figure 1:
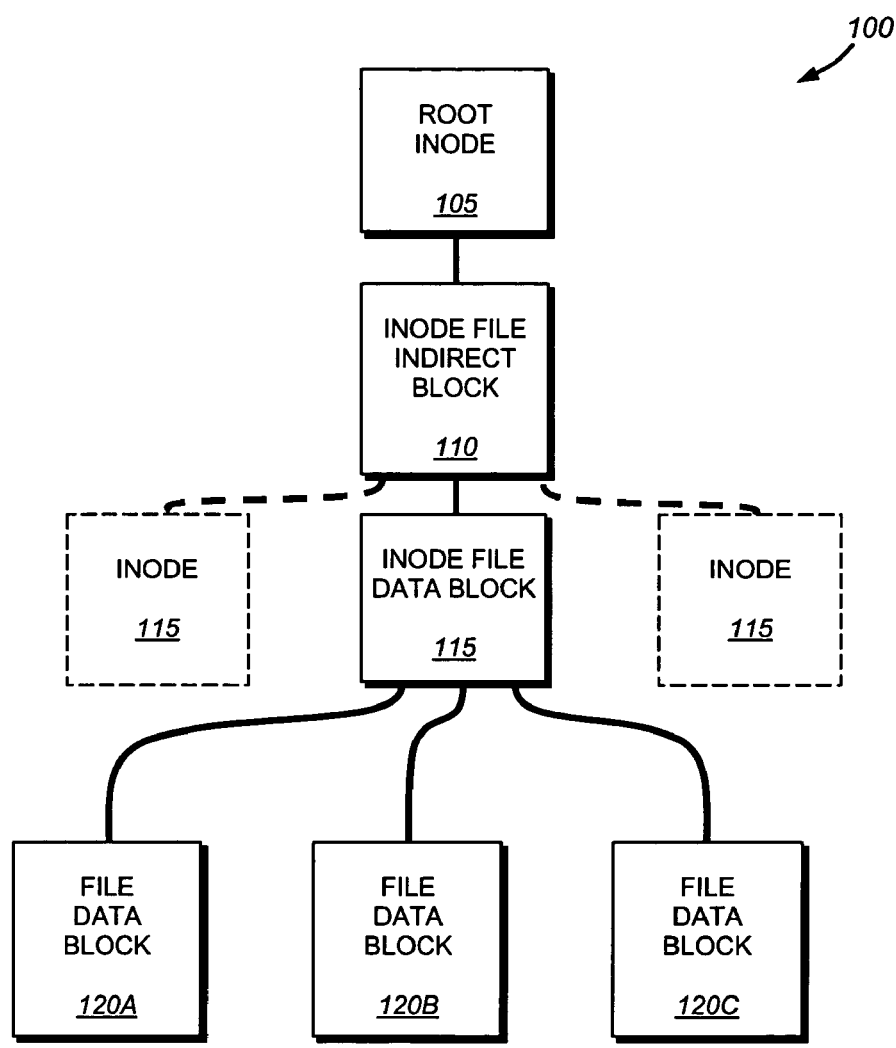
FIG. 1, already described, is schematic block diagram of an exemplary file system inode structure about to undergo a PCPI procedure according to the prior implementation.
Figure 2:
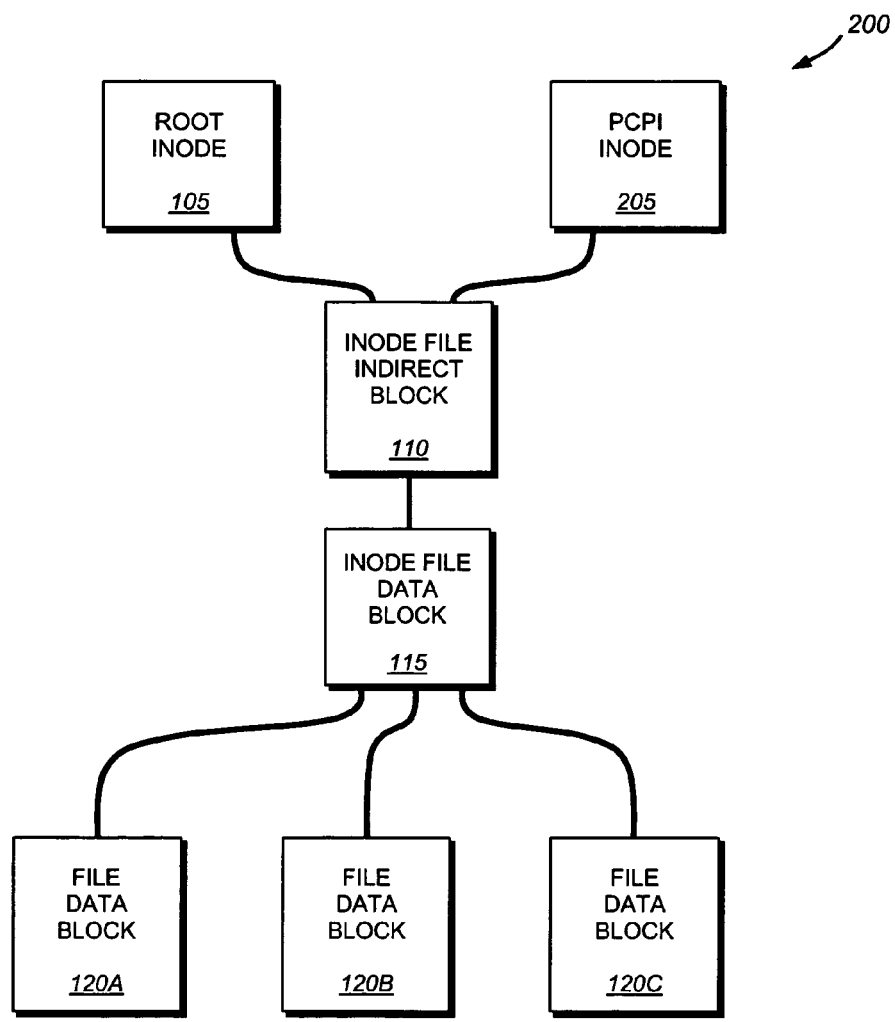
FIG. 2, already described, is a schematic block diagram of the exemplary file system inode structure of FIG. 1 including a PCPI inode, according to a prior implementation.
Figure 3:
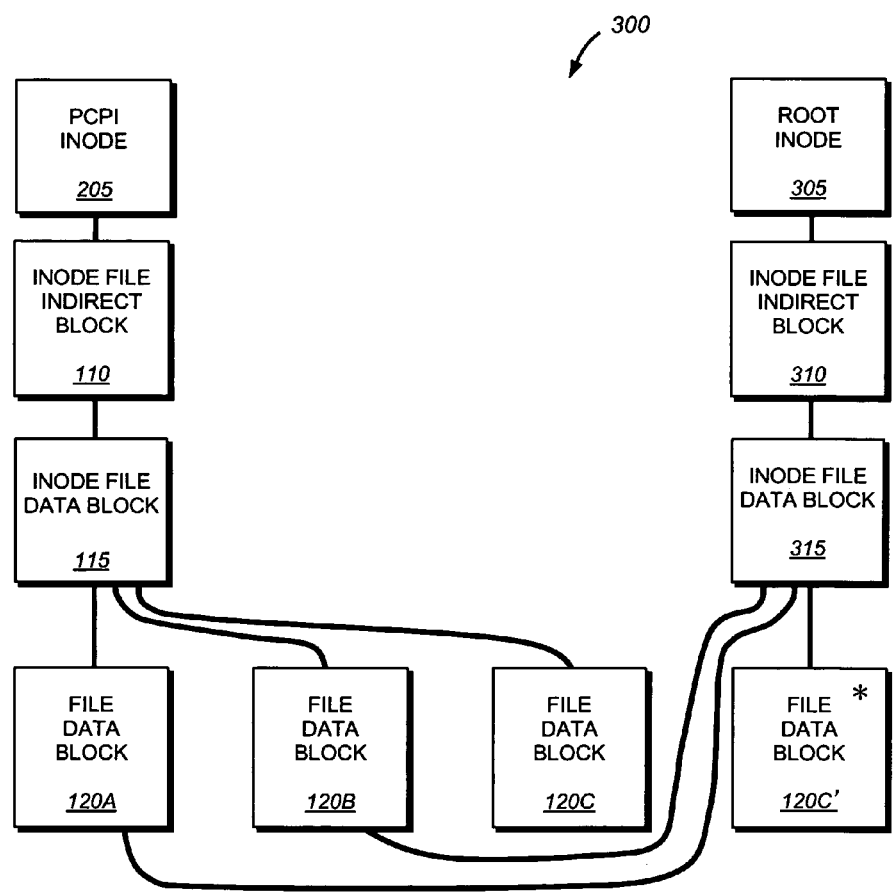
FIG. 3, already described, is a schematic block diagram of an exemplary file system inode structure of FIG. 1 after data block has been rewritten, according to a prior implementation.
Figure 4:
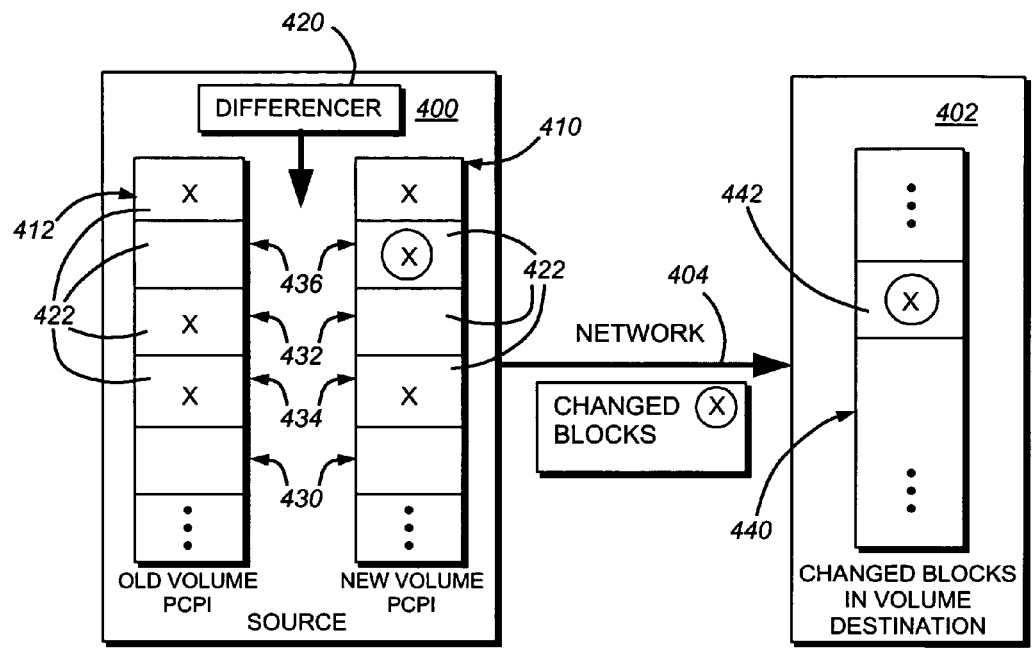
FIG. 4, already described, is a schematic block diagram of an exemplary remote mirroring of a volume file system from a source file server to a destination file server over a network according to a prior implementation.
Figure 5:
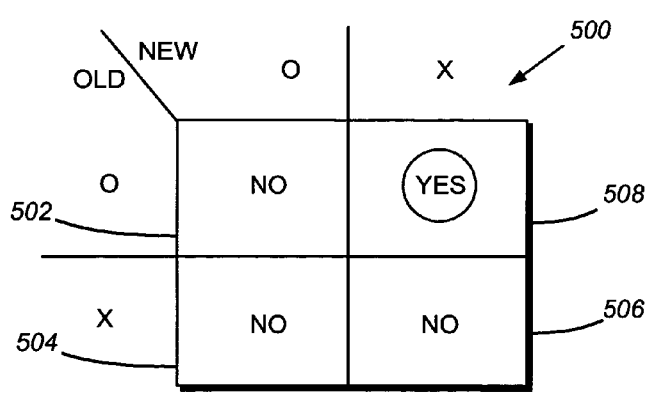
FIG. 5, already described, is a decision table used by a block differencer of FIG. 4 for determining whether a change in a block is to be transmitted from the source file server to the destination file server according to a prior implementation.
Figure 6:
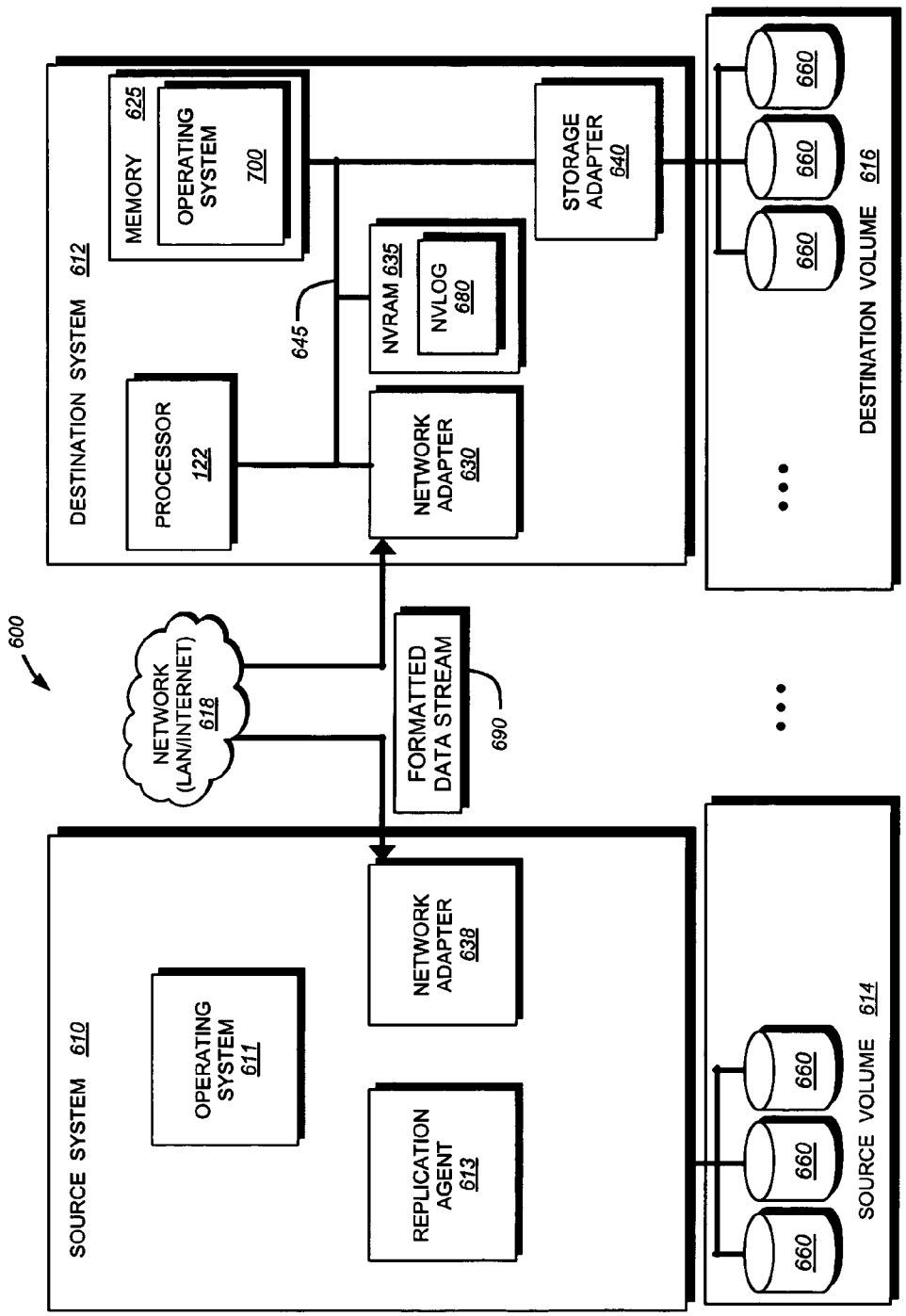
FIG. 6 is a schematic block diagram of an exemplary source storage system and destination storage system interconnected by a network and transmitting a formatted data stream in accordance with an illustrative embodiment of this invention.

By way of further background, FIG. 6 is a schematic block diagram of a storage system environment 600 that includes a pair of interconnected storage systems (e.g. file servers, computers, networked storage devices) and the like including a source system 610 and a destination system 612 that may be advantageously used with the present invention. For the purposes of this description, the source system is a networked computer that manages storage one or more storage disks 662. The source 610 executes an operating system 611. The operating system 611 may be, for example, the commercially available Sun Microsystems's Solaris®, Microsoft Windows® 2000, HP/IUX or AIX. The operating system 611 implements an OS-specific file system on the disks 662 connected to the source system 610.

The destination system, in this example is a file server or filer 612 that manages one or more destination volumes 616, comprising arrays of disks 660. The source 610 and destination 612 are linked via a network 618 that can comprise a local or wide area network, such as the well-known Internet. An appropriate network adapter 636 and 630, residing the source and destination 610, and 612 respectively, facilitates communication over the network 618. Note, as used herein, the term "source" can be broadly defined as a location from which the subject data of this invention travels and the term "destination" can be defined as the location to which the data travels. While a source system and a destination filer, connected by a network, is a particular example of a source and destination used herein, a source and destination could be computers/filers linked via a direct link, or via loopback (a "networking" arrangement internal to a single computer for transmitting a data stream between local source and local destination), in which case the source and the destination may comprise the same filer.

The destination filer 612 comprises a processor 620, a memory 625, a network adapter 630 and a storage adapter 640 interconnected by a system bus 645. The destination filer 612 also includes a storage operating system 700 (FIG. 7) that implements a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, the destination filer 612 can be broadly, and alternatively, referred to as a "storage system." Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the destination memory 625 comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The storage operating system 700, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 630 comprises the mechanical, electrical and signaling circuitry needed to connect the filer 612 to the network 618, which may comprise a point-to-point connection or a shared medium, such as a local area network. Moreover the source 610 may interact with the destination filer 612 in accordance with a client/server model of information delivery. That is, the client may request the services of the filer, and the filer may return the results of the services requested by the client, by exchanging packets encapsulating, e.g., the TCP/IP protocol or another network protocol format over the network 618.

The storage adapter 640 cooperates with the operating system 700 (FIG. 7) executing on the filer to access information requested by the client. The information may be stored on the disks 360 that are attached, via the storage adapter 640 to the filer 612 or other node of a storage system as defined herein. The storage adapter 640 includes input/output (I/O) interface circuitry that couples to the disks over an I/O interconnect arrangement, such as a conventional high-performance, Fibre Channel serial link topology.

Each system 610, 612 may also be interconnected with one or more clients (not shown) via the network adapters 636, 630, respectively. The clients transmit requests for file service to the destination filer 612 respectively, and receive responses to the requests over a LAN or other network (618). Data is transferred between the client and the filer 612 using data packets defined as an encapsulation of the Common Internet File System (CIFS) protocol or another appropriate protocol, such as NFS.

In one exemplary filer implementation, the destination filer 612 can include a nonvolatile random access memory (NVRAM) 635 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

In an illustrative embodiment, the disks 660 are arranged into a plurality of volumes (for example, source volumes 614 and destination volumes 616), in which each volume has a file system associated therewith. The volumes each include one or more disks 660. In one embodiment, the physical disks 660 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume. Information in the volumes may be organized as files, directories and virtual disks (vdisks). That is, to facilitate access to the disks, the destination storage operating system 700 implements a write-anywhere file system that logically organizes the information as a hierarchical structure of directory, file and vdisk objects (hereinafter "directories", "files" and "vdisks") on the disks. A vdisk is a special file type that is translated into an emulated disk or logical unit number (lun) as viewed by a storage are network (SAN) client, which may implement a block-based protocol for storage organization. Each "on-disk" file may be implemented as set of disk blocks configured to store information, such as data, whereas the directory may be implemented as a specially formatted file in which names and links to other files and directories are stored. Vdisks are further described in U.S. patent application Ser. No. 10/216,453, entitled STORAGE VIRTUALIZATION BY LAYERING VIRTUAL DISK OBJECTS ON A FILE SYSTEM, by Vijayan Rajan, et al. the teachings of which are hereby incorporated by reference. As will be made more clear with reference to the storage operating system 700 below, the exemplary destination filer 700 may be characterized more particularly as a multiprotocol storage appliance, capable of receiving storage requests according to a plurality of protocols and performing storage service operations according to either a file-based or block-based organization.

In the illustrative embodiment, the source volume 614 is mirrored to the destination volume using a qtree-based mirroring technique, such as that described in the above-incorporated patent application entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al. However, it should be noted that the technique of the present invention may be utilized with any acceptable mirroring technique that may be suitably modified to utilize the teachings of the present invention. To facilitate the transfer of replica data from the source 610 to the destination 612 via the network 618, a formatted data stream 690 according to this invention is employed. This data stream is described in detail below.

B. Storage Operating System

In the illustrative embodiment, the storage operating system resident on the destination filler is the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any file system and/or storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT® or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 7:
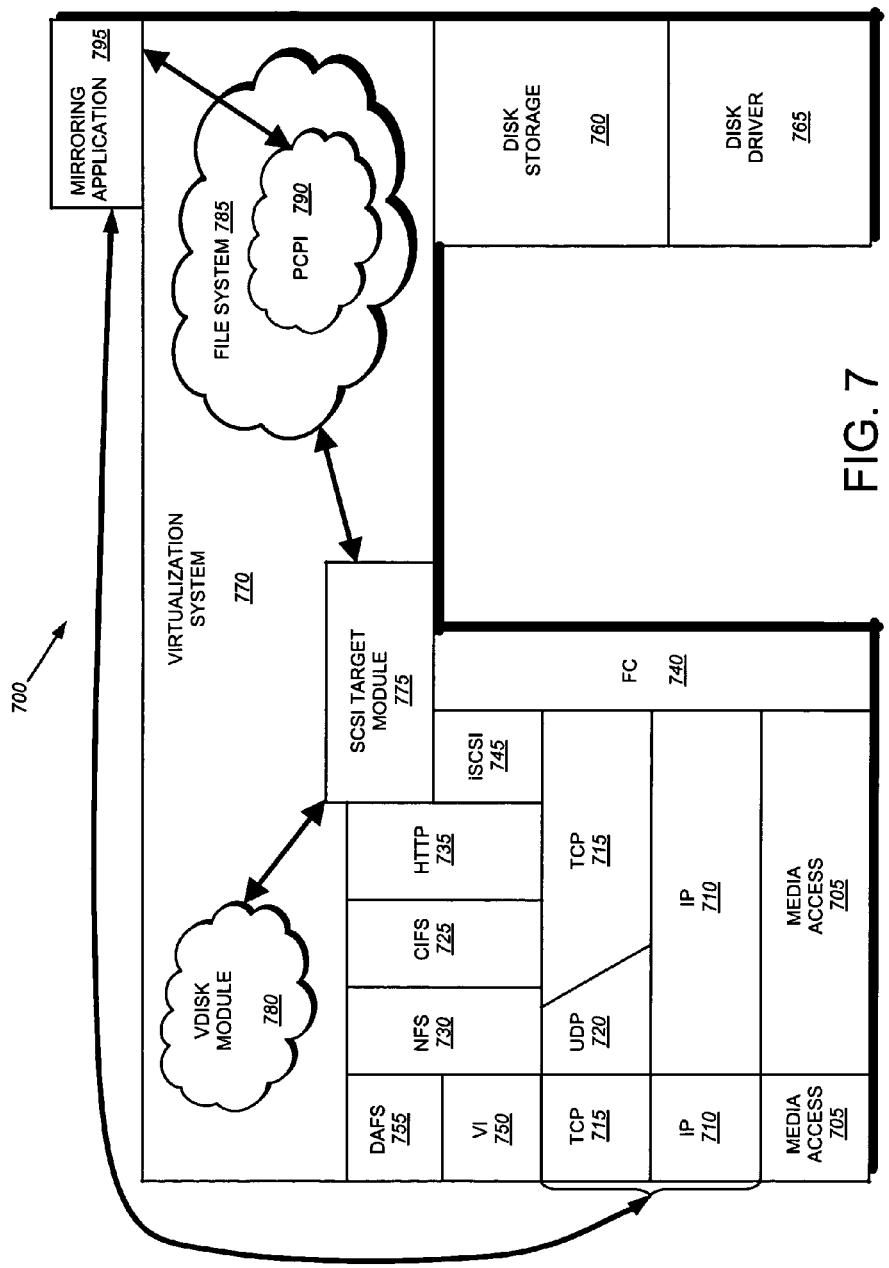
FIG. 7 an exemplary storage operating system running on the destination storage system in accordance with an embodiment of the present invention.

FIG. 7 is a schematic block diagram of an illustrative storage operating system 700 that may be advantageously used with the present invention. The storage operating system comprises a series of software layers organized to form an integrated network protocol stack or, more generally, a multiprotocol engine that provides data paths for clients to access information stored on the storage appliance using block and file access protocols. The protocol stack includes a media access layer 705 of network drivers (e.g., gigabit Ethernet drivers) that interfaces to network protocol layers, such as the IP layer 710 and its supporting transport mechanisms, the TCP layer 715 and the User Datagram Protocol (UDP) layer 720. A file system protocol layer provides multi-protocol file access and, to that end, includes support for the DAFS protocol 755, the NFS protocol 730, the CIFS protocol 725 and the Hypertext Transfer Protocol (HTTP) protocol 735. A VI layer 750 implements the VI architecture to provide direct access transport (DAT) capabilities, such as remote direct memory access (RDMA), as required by the DAFS protocol 755.

An iSCSI driver layer 745 provides block protocol access over the TCP/IP network protocol layers, while a FC driver layer 740 operates with a Fibre Channel adapter in the filer 612 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the storage appliance. In addition, the storage operating system includes a disk storage layer 760 that implements a disk storage protocol, such as a RAID protocol, and a disk driver layer 765 that implements a disk access protocol such as, e.g., a SCSI protocol.

Bridging the disk software layers with the integrated network protocol stack layers is a virtualization system 770 that is implemented by a file system 785 interacting with virtualization modules illustratively embodied as, e.g., vdisk module 780 and SCSI target module 775. It should be noted that the vdisk module 780, the file system and SCSI target module 775 can be implemented in software, hardware, firmware, or a combination thereof. The vdisk module 780 interacts with the file system 785 to enable access by administrative interfaces in response to a system administrator issuing commands to the filer 612 in its arrangement as a multi-protocol storage appliance. In essence, the vdisk module 780 manages SAN deployments by, among other things, implementing a comprehensive set of vdisk (lun) commands issued through a user interface by a system administrator. These vdisk commands are converted to primitive file system operations ("primitives") that interact with the file system 785 and the SCSI target module 775 to implement the vdisks.

The SCSI target module 775, in turn, initiates emulation of a disk or lun by providing a mapping procedure that translates luns into the special vdisk file types. The SCSI target module is illustratively disposed between the FC and iSCSI drivers 740, 745 and the file system 785 to thereby provide a translation layer of the virtualization system 770 between the SAN block (lun) space and the file system space, where luns are represented as vdisks.

The file system 785 illustratively implements the WAFL file system having an on-disk format representation that is block-based using, e.g., 4-kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., the contents of which are hereby incorporated by reference.

The storage operating system 700 further includes, in the illustrative embodiment, a mirroring application 795 that performs volume-based, qtree-based, or another sub-volume level mirroring function. The mirroring application 795 is illustratively integrated with the TCP 715 and IP 710 layers and a PCPI processes 790 within the file system 785. The mirroring application 795 utilizes TCP/IP for communication with the upstream and/or downstream within a cascaded chain of storage systems. The mirroring application 795 utilizes the PCPI processes 790 within the file system 785 to determine changed blocks within volumes and/or qtrees.

C. Remote Asynchronous Mirroring

The general principles of remote asynchronous mirroring of a volume or subvolume/qtree data set from a source to a destination are described in detail in the above-incorporated U.S. patent application Ser. No. 10/100,950, entitled SYSTEM AND METHOD FOR ASYNCHRONOUS MIRRORING OF SNAPSHOTS AT A DESTINATION USING A PURGATORY DIRECTORY AND INODE MAPPING, by Stephen L. Manley, et al., and other related applications incorporated hereinabove. The illustrative embodiment of the invention employs the techniques described in these above-incorporated patent applications to receive and store, as a replica data set of the source, on the destination side, a data stream generated by the source. The source data may be organized in a variety of manners and appropriate mechanisms on the source side (in its replication agent 613) are used to generate the formatted data stream 690 in accordance with the illustrative embodiment of this invention. In one embodiment, both the source system and the destination system include respective pipelines (described further below) for generating and decoding the formatted data stream.

Figure 8:
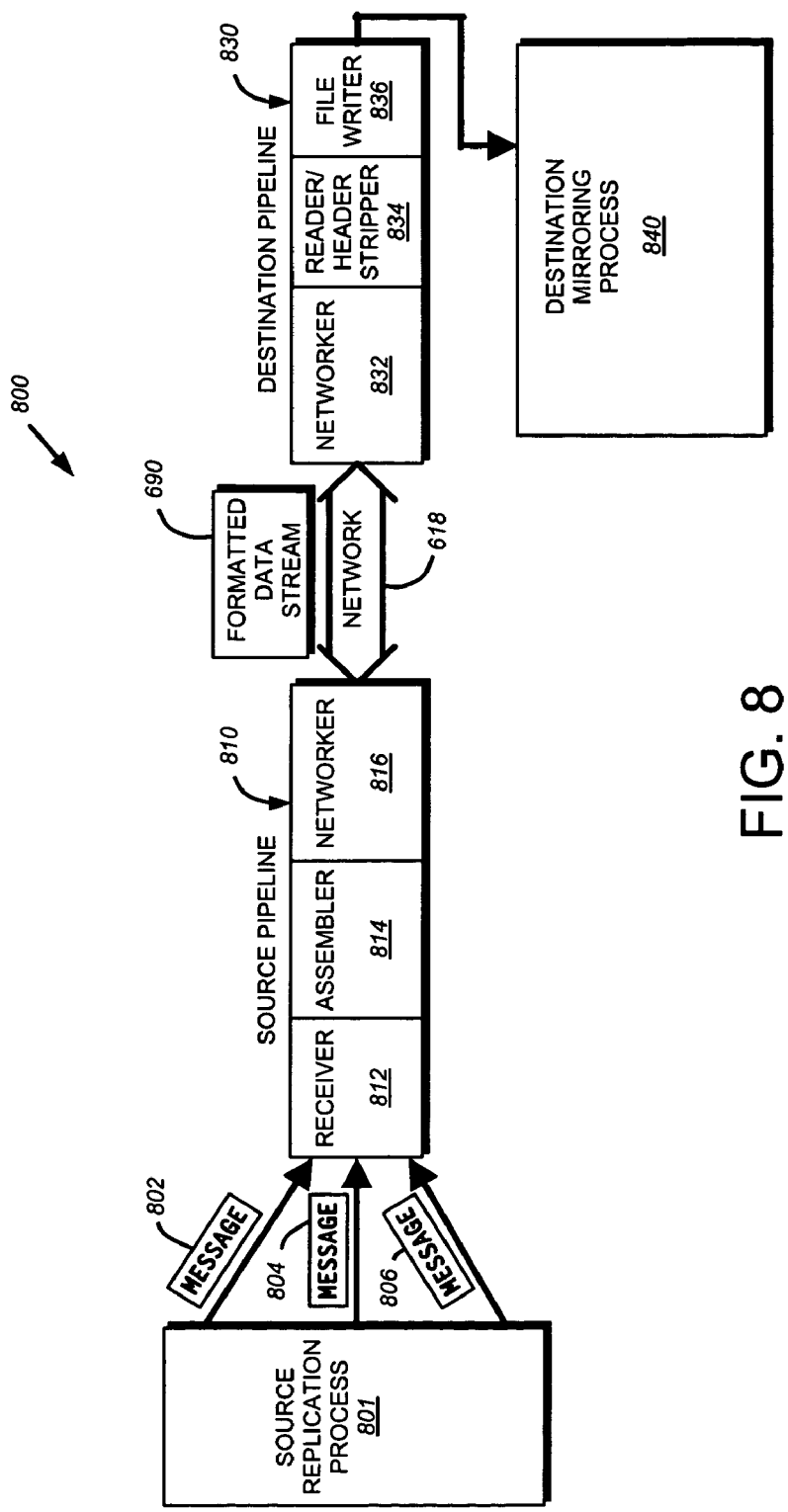
FIG. 8 is a schematic block diagram of a transmission scheme for data across a network between a source storage system and a destination storage system.

With further reference to FIG. 8, the transmission of data to be backed up from the source system to the destination replica is described in an overview 800. The replication process 801 each sends messages 802, 804 and 806 containing the change information to a source pipeline 810. Note that this pipeline is only an example of a mechanism to implement a mechanism for packaging file system data into the formatted data stream 690 and sending that stream to a network layer. The messages are routed first to a receiver 812 that collects the messages and sends them on to an assembler 814 as a group comprising the snapshot change information to be transmitted over the network 618. Again, the "network" as described herein should be taken broadly to include anything that facilitates transmission of volume sub-organization (e.g. qtree) change data from a source sub-organization to a destination sub-organization, even where source and destination are on the same file server, volume or, indeed (in the case of rollback as described in the above-incorporated U.S. patent application entitled SYSTEM AND METHOD FOR ASYNCHRONOUS MIRRORING OF SNAPSHOTS AT A DESTINATION USING A PURGATORY DIRECTORY AND INODE MAPPING) are the same sub-organization at different points in time. An example of a "network" used as a path back to the same volume is a loopback. The assembler 814 generates the specialized format 690 described in detail below for transmitting the data stream of information over the network 618 that predictable and understood by the destination. The networker 816 takes the assembled data stream and forwards it to a networking layer. This format is typically encapsulated within a reliable networking protocol such as TCP/IP. Encapsulation can be performed by the networking layer, which constructs, for example, TCP/IP packets of the formatted replication data stream.

As changed information is forwarded over the network, it is received at the destination pipeline piece 830. This pipeline also includes a networker 832 to read out TCP/IP packets from the network into the snapshot replication data stream format 690 encapsulated in TCP/IP. A data reader and header stripper 834 recognizes and responds to the incoming format 690 by acting upon information contained in various format headers (described below). A writer 836 is responsible for placing data derived from the format into appropriate locations on the destination file system. The storage and handling of backup data is implemented by the destination mirroring process 840. Various embodiments of this process is described in detail in the above-incorporated SYSTEM AND METHOD FOR ASYNCHRONOUS MIRRORING OF SNAPSHOTS AT A DESTINATION USING A PURGATORY DIRECTORY AND INODE MAPPING and related applications thereto. Briefly, according to one example, the destination pipeline 830 forwards data and directory information to the main destination mirror process 840. The exemplary destination mirror process 840 consists of a directory stage 842, which builds the new replicated file system directory hierarchy on the destination side based upon the received changes in a PCPI on the source. To briefly summarize, the directory stage creates, removes and moves files based upon the received formatted information. A map of inodes from the destination to the source is generated and updated. In this manner, inode numbers on the source file system are associated with corresponding (but typically different) inode numbers on the destination file system. Notably, a temporary or "purgatory" directory is established to retain any modified or deleted directory entries until these entries are reused by or removed from the replicated snapshot at the appropriate directory rebuilding stage within the directory stage. In addition, a file stage of the destination mirror process populates the established files in the directory stage with data based upon information stripped from associated format headers.

D. Data Format

The formatted data stream 690 is predicated upon having a structure that supports multiple protocol attributes (e.g. Unix permissions, NT access control lists (ACLs), NT streams, file type, file-create/modify time, etc.). The format should also identity the data in the stream (i.e. the offset location in a file of specific data or whether files have "holes" in the file offset that should remain free). The names of files, in a variety of formats, character types, and settings should also be relayed by the format. More generally, the format should also be independent of the underlying network protocol or device (in the case of a tape or local disk/non-volatile storage) protocol and file system—that is, the information is system "agnostic," and not bound to a particular operating system software, thereby allowing source and destination systems of different vendors to share the information. The format should, thus, be completely self-describing requiring no information outside the data stream to decipher it. In this manner a source file directory of a first type can be readily translated into destination file directory of a different type. It should also allow extensibility, in that newer improvements to the source or destination operating system should not affect the compatibility of older versions. In particular, a data set (e.g. a new header) that is not recognized by the operating system should be ignored or dealt with in a predictable manner without triggering a system crash or other unwanted system failure (i.e. the stream is backwards compatible). This format should also enable transmission of a description of the whole file system, or a description of only changed blocks/information within any file or directory. In addition, the format should generally minimize network and processor overhead.

Figure 9:
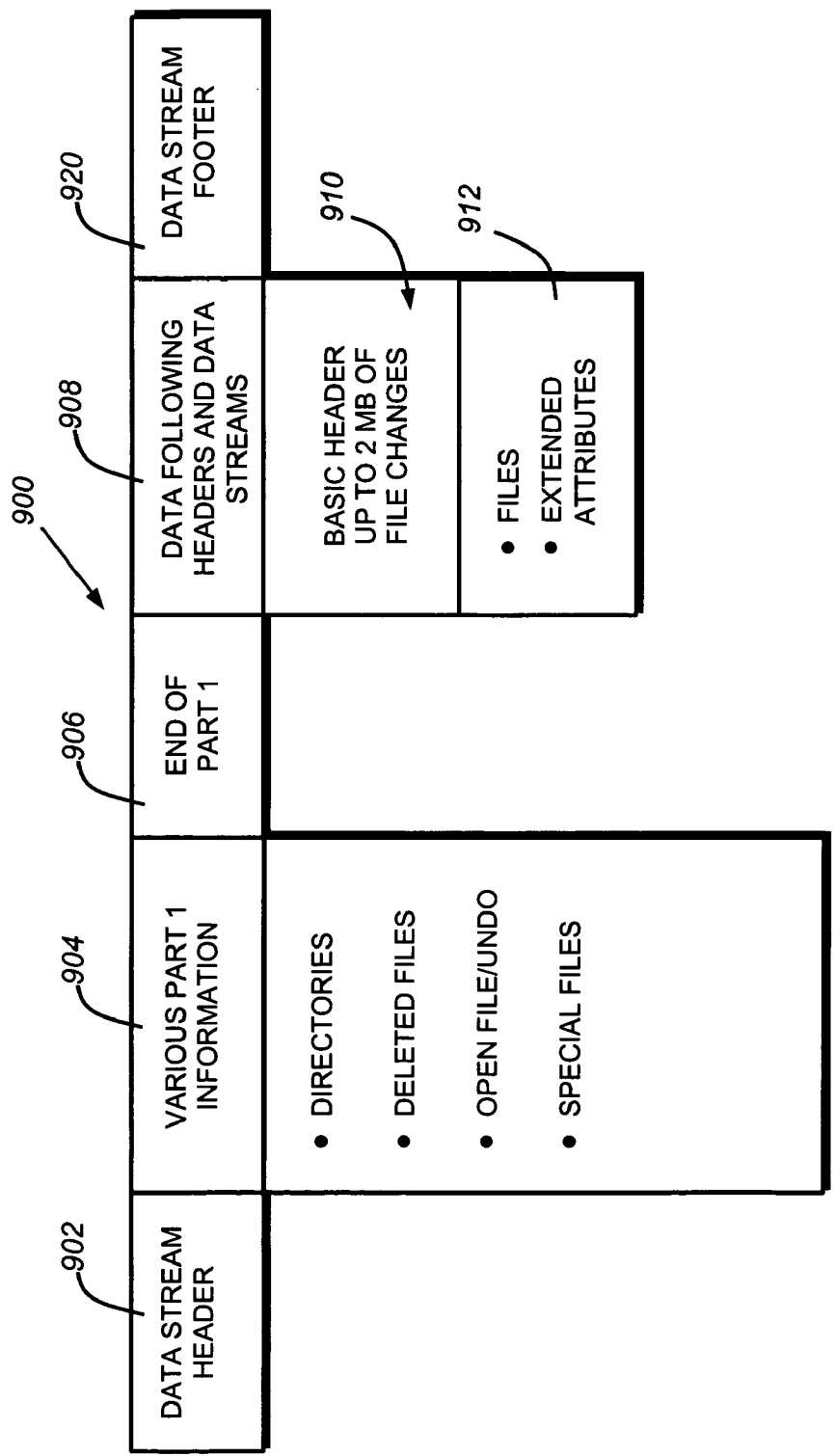
FIG. 9 is a schematic block diagram of the layout of a formatted data stream including standalone and data following headers according to an embodiment of the present invention.
Figure 10:
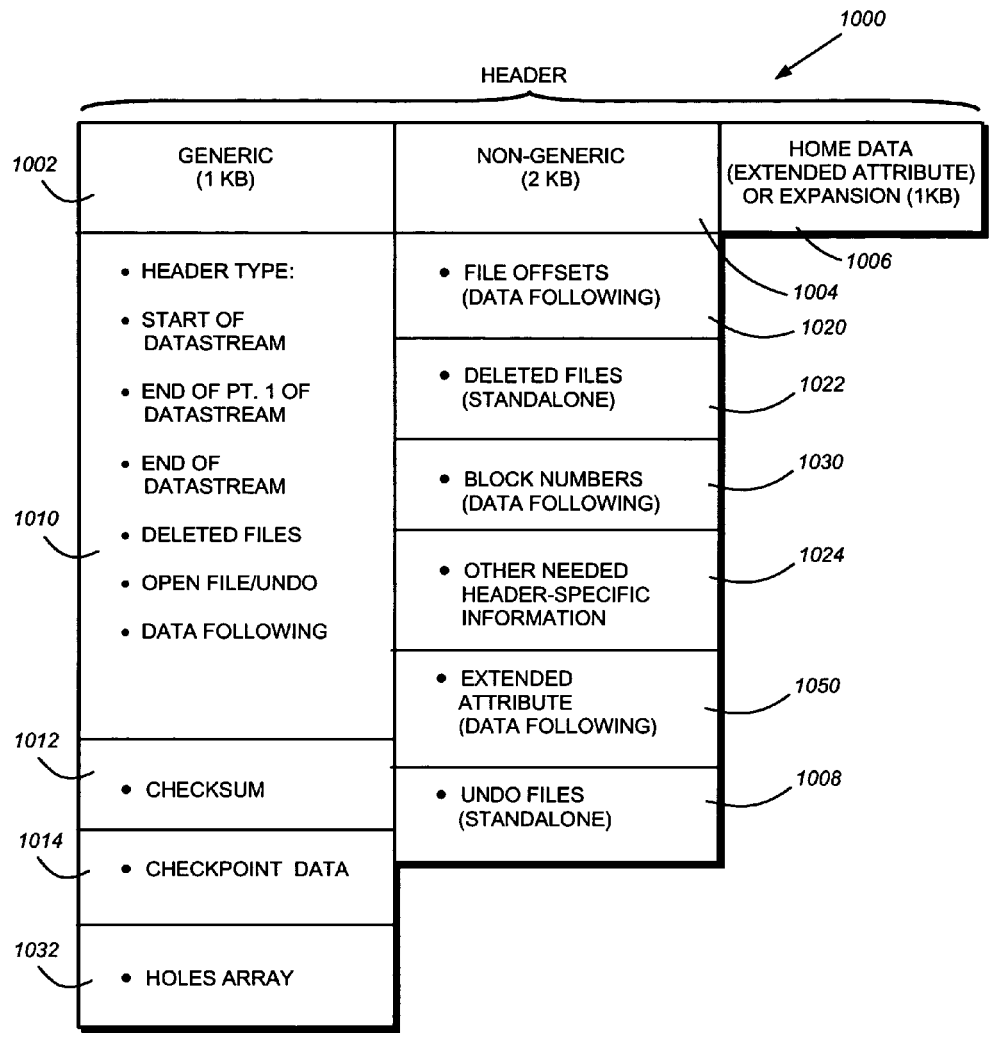
FIG. 10 is a more detailed schematic block diagram of the layout of both standalone and data following headers in accordance with FIG. 10.
Figure 11:
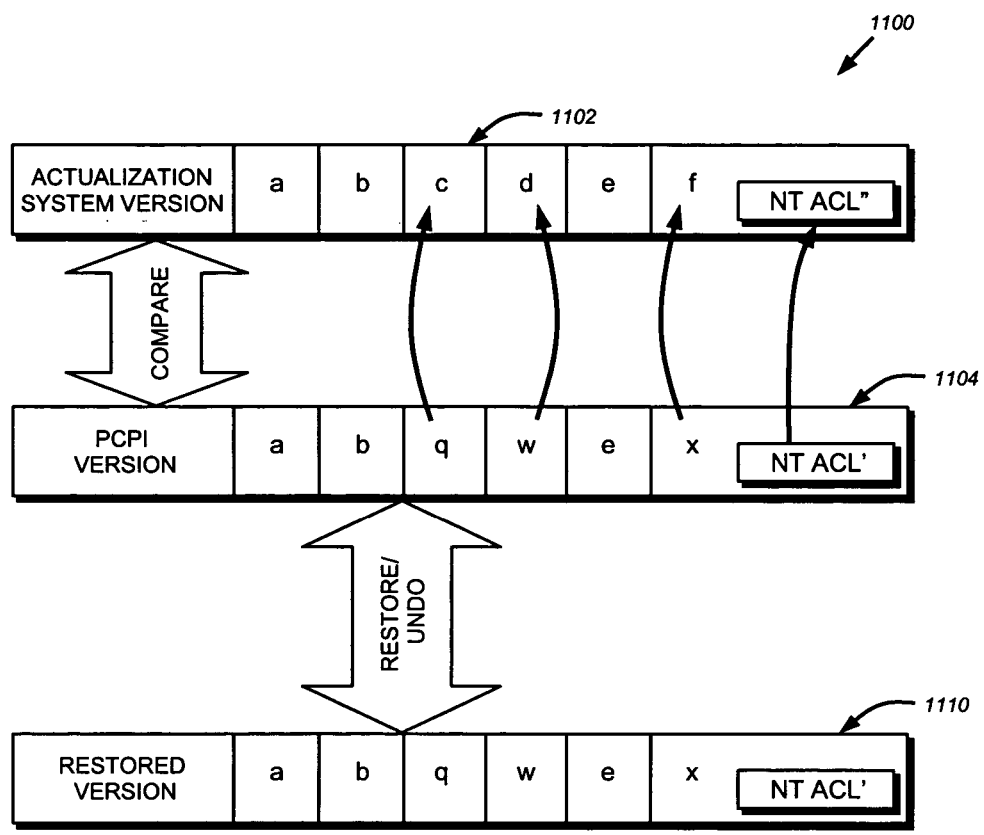
FIG. 11 is a schematic block diagram of an exemplary file on the destination storage system that is to be restored to an earlier state using an open file/undo header transmitted from the source.

The format into which source snapshot changes are organized is shown schematically in FIGS. 9, 10 and 11. In the illustrative embodiment, the format is organized around 4-KB blocks.

FIG. 9 describes the transmission format 900 of the illustrative formatted replication data stream 690 in further detail. In general, the format provides a plurality of 4-KB "standalone headers" that contain data and instructions related various aspects of the data transmission. These standalone headers appear at various points within the overall data stream and serve to characterize the stream or provide the destination with instructions on how to handle certain data. There are also 4-KB "data following" headers that are placed at the head of each individual stream of "raw" data (e.g. file, directory and other information destined to become stored data on the destination. In this embodiment, data following headers are interposed between each 2 MB of data.

As described further below, with brief reference to the 4-KB header layout 1000 diagrammed FIG. 10, each header (both standalone and data following) includes three separate regions or parts. The first 1-KB part is a "generic" part that identifies the header type from an enumerated group 1010 of header types. In the next 2-KB "non-generic" part 1004 resides data that is relevant to the header type. Finally, the last 1-KB part 1006 unused (available for later expansion), or in the case of a named extended attribute for a file, tends to store the name of the attribute. The header size and arrangement can be widely varied in alternate embodiments, however.

Also in the generic part 1002 of the header 1000 is a checksum 1012 that ensures the header is not corrupted. In addition, other data such as a "checkpoint" 1014 used by the source and destination to track the progress of replication is provided. By providing an enumerated list of header types, the destination can more easily operate in a backwards-compatible mode—that is, a header type that is not recognized by the destination (provided from a newer version of the source) can be more easily ignored, while recognized headers within the limits of the destination version are processed as usual.

Note that the kind of data in the non-generic part 1004 of the header 1000 generally depends on the header type. It could include information relating to file offsets (1020) in the case of the basic header, used for follow-on data transmission, deleted files (in a standalone header listing of such files that are no longer in use on the source or whose generation number has changed) (1022), or other header-specific information (1024 to be described below). Again, the various standalone headers are interposed within the data stream format at an appropriate location. Each header is arranged to either reference an included data set (such as deleted files) or follow-on information (such as file data).

Referring again to FIG. 9, the transmission format 900 is headed by a standalone data stream header 902 of the type "start of data stream." The start of data stream header contains data in the non-generic part 1004 generated by the source describing the attributes of the data stream.

Next, a series of headers and follow-on data in the format 900 define various "part 1" information (904). Significantly, each directory data set being transmitted is preceded by a data following header with no non-generic data. In one illustrative embodiment, only directories that have been modified are transmitted, and they need not arrive in a particular order. Note also that the data from any particular directory need not be contiguous. By transmitting only modified directory information, the overall amount of data transmitted to the destination is minimized, saving time and network bandwidth. Each directory entry is loaded into a 4-KB block. Any overflow is loaded into a new 4-KB block. Each directory entry is a header followed by one or more names, of different types, that permits multi-protocol communication between systems utilizing differing operating systems, language settings, or naming conventions. The entry describes an inode and the directory names to follow.

Deleted file information (described above) is also sent with such information included in the non-generic part 1004 of one or more standalone headers (if any). By sending this information in advance, the directory tree builder can differentiate between moves and deletes.

Notably, the part 1 format information 904 also includes a specific open file/undo standalone header this header is used by the source to instruct the destination that a current file or other set of data (typically identified (see 1008) in the non-generic part 1004) transmitted from the source should be ignored. The destination, will thus, revert to a previous PCPI for any identified "undone" files or data sets. The undoing of an open file is described further below.

Finally, the standalone headers in part 1 format information 904 denote special files. Such special files may exist for every change in a symlink, named pipe, socket, block device, or character device in the data stream. These files are sent first, because they are needed to assist the destination in building the infrastructure for creation of the replicated file system before it is populated with file data.

Once various part 1 information 904 is transmitted, the format calls for a "midstream" or "end of part 1 of the data stream" header 906. This is a standalone header having no data in its non-generic part 1004. This header tells the destination that part 1 is complete and to now expect a data stream consisting of files, and/or other data to be stored on the destination.

After the part 1 end or midstream header 906, the format then presents the raw file and data stream 908. A data following header (910) is provided before every 2 MB (or less) of data, followed by the data stream 912 itself. The files or other data structures comprising the data stream need not be written in a particular order, nor must their constituent data be contiguous. Note, with reference to the header layout diagram in FIG. 10, the data following header includes a block numbers data structure 1030, associated with its non-generic part 1004. This block numbers structure 1030 works in conjunction with the "holes array" 1032 within (in this example) the generic part 1002. The holes array 1032 denotes empty space in the data stream. The block numbers structure 1030, in essence, provides the mapping from the holes array to corresponding blocks in the file or other data set. This structure thereby instructs the destination where to write data blocks or holes.

In general, files/data sets (912) are written in 4-KB chunks with data following headers at every 512 chunks (2 MB), at most. Alternate data streams (also 912) are transmitted like regular files in 4-KB chunks with at most 2 MB between headers. By interspersing headers in large files in the replicated data stream format, the source and destination can create restorability checkpoints at an extremely fine granularity. These checkpoints are extremely useful when attempting to execute a transfer over a loss or slow network.

Referring to FIG. 9, the end of the replicated data stream format 900 is marked by a footer 920 consisting of standalone header of the type "end of data stream." This header has no specific data in its non-generic part 1004 (FIG. 10). It instructs the destination that the particular data stream transmission is complete.

Notably, as shown in FIGS. 9 and 10, the data following header can include extended file attributes (see 912 and 1050). The extended attribute is implemented so as to ensure cross-platform compatibility (e.g. compatibility between source and destination systems utilizing different data organizations, operating systems and/or protocols) by causing the source to identify all attributes uniquely associated with it's files/data sets. The handling of extended attributes enables multi-protocol implementation in which one side of the replication relationship can seamlessly extend the protocol to add new, previously unknown data types. Data types are divided into two categories: known data types and unknown data types. If the source and destination both know about a data type, then it is handled in the appropriate manner. If the source generates a data type about which the destination does not know, the protocol enables the source to specify an "out of range" data type. The destination can then store the attribute in a hidden structure inherent to the destination system. Within this framework, if the source data type is crucial (e.g., for security) and must be stored in the live file system, the source can also insist that the data type be understood. If the destination encounters a file type which it does not understand, but is expected to use, it can abort the process and recommend a replication version upgrade to match the source.

Where a data following header includes extended attributes, they typically reside in the non-generic part 1004 (see 1050). The extended attribute calls out a variety of information that is platform (source)-specific. For example such attributes would include identification in the data stream of the presence of: Hewlett Packard UX™ ACLs, Sun Microsystems Solaris® ACLs, Windows NT™ streams or object identifiers (IDs), sparse streams, and the like. In this embodiment, the source replication process 801 (FIG. 8) is responsible for identifying which attribute extension should be applied to the header from a list of enumerated (known) attribute extensions that are recognized by both the source and the destination. This decision may be based upon the type of file/data set being transmitted or upon inherent properties of the data set given the destination's architecture or operating system. For example, in the case of an NT stream, the extended attribute identifies that the following file data is part of an NT stream and that an associated stream name should be identified and stored (see below). The length of the name as well as its type (example: "unicode/8.3/Unix") is stored under the attribute extension 1050 field in the non-generic part of the header. Upon receiving a data following header, the destination mirroring process 840 identifies such an attribute extension from it's enumerated list and, performs one of steps a-c above. If an attribute is unrecognized, it is either stored in hidden data structure or the process is aborted to enable to destination to be upgraded.

As noted above, the last 1-KB space 1006 in the layout of the header 1000 is reserved for expansion in most header types. However, where a data following header includes a recognized attribute extension, any names associated with the attribute (such as an NT stream names are stored in this space). Accordingly, the bits making up the actual name are therefore stored in the last part 1006.

E. Open File/Undo

It is contemplated that some source systems may lack a mechanism to lock out users during a backup operation in which modified files are transmitted to the destination system. If the file is in the midst of modification, the version sent to the destination may actually be corrupt. As such, the destination will store a corrupt version of the file, and that version will remain as the backup version until a new update is sent from the source to the destination with a newly modified version on the file. As described above, to ensure coherency in the backup version, a standalone header having an open file/undo type (see 1010 in FIG. 10) and identifier (1008) of the file or files (data sets) to be undone is provided.

Figure 12:
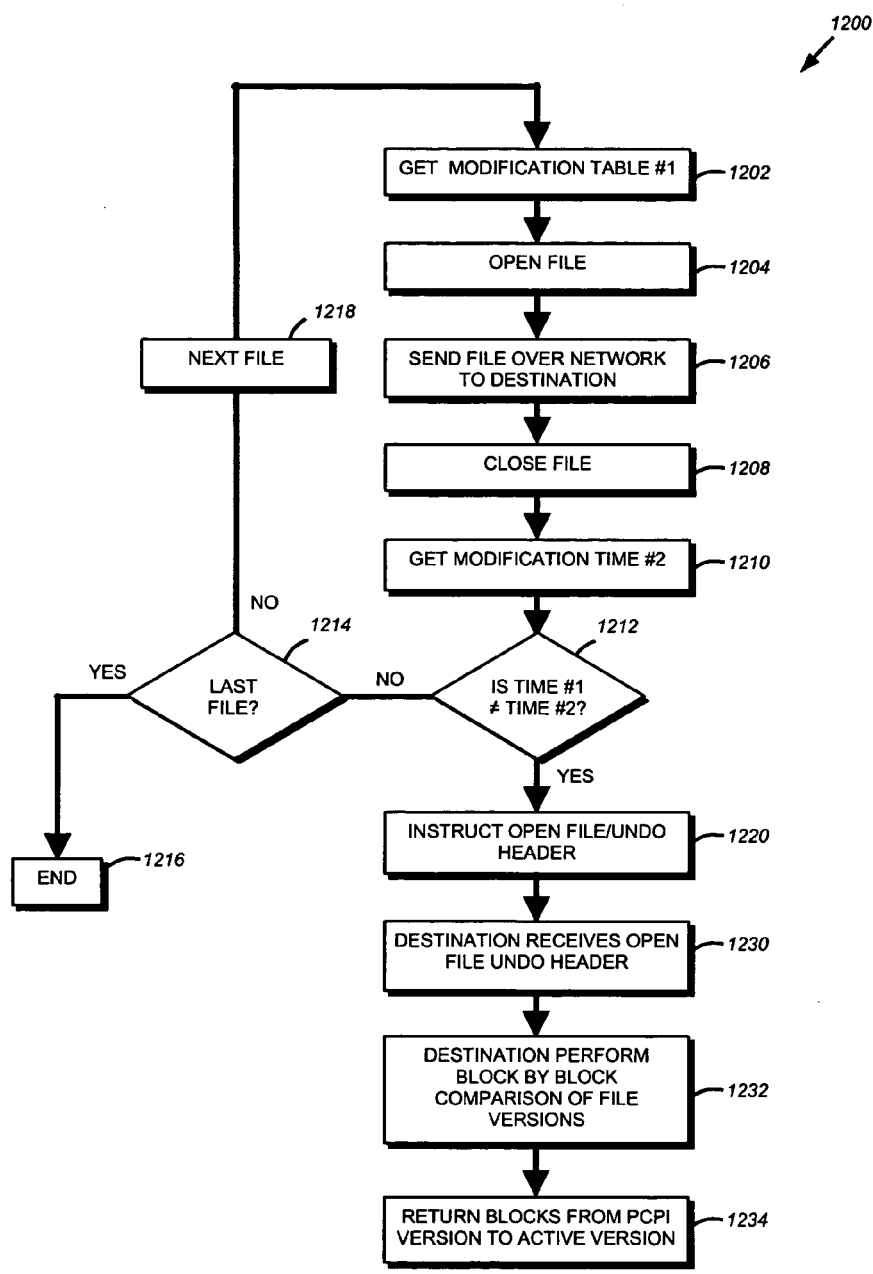
FIG. 12 is a flow chart detailing the steps of a procedure for identifying a modified file on the source storage system and for restoring an earlier version of that file on the destination storage system in accordance with an embodiment of the present invention.

FIGS. 11 and 12 show an exemplary changed file 1100 on the destination and procedure 1200 for undoing a changed file, respectively. By way of example, the destination has received modified file 1002 having blocks a, b, c, d, e and f. Note, block f contains an exemplary NT ACL". Assuming that the file 1102 was written from a transmitted source file that was in the midst of modification the following procedure 1200 applies. The destination, through its replication process retrieves the file's current modification time (Time #1) from its properties (step 1202). The file is then opened (step 1204). The file is transmitted over the network, a process that may take significant time, depending upon file size (step 1206). After transmission the file is closed (step 1208) and the file's modification time is again retrieved. If the two modification times are the same (Time #1=Time #2) then no modifications have been made during the backup process and the procedure branches (via decision step 1212 on the source) to decision step 1214. If the file is the last file in the backup, then the procedure ends (step 1416), otherwise the next file is identified (step 1218) and the procedure repeats from step 1202 for the next file. However, if the two modification times do not match (Time #1≠Time #2), then this indicates that a modification occurred during the backup/transmission procedure. Decision step 1212 then instructs creation and transmission of an open file/undo header as described above, identifying the problematic file (step 1220).

According to step 1230, the destination receives the open file undo header at some point during the transmission. The destination then accesses a PCPI version of the file (version 1104 in FIG. 11) and performs a block-by-block comparison of the two versions 1102 and 1104 (step 1232). In the example of FIG. 11, the PCPI version 1104 contains blocks q, w and x that show changes with respect to blocks c, d and f. Likewise NT ACL" appears as a different NT ACL' on the PCPI version 1104. Of course, the number of blocks may vary between the versions. In accordance with step 1234, the source uses the comparison to map all changed blocks back to the active version from the PCPI version to generate, in the active file system a restored version 1110. This version represents an earlier, unmodified version of the file and has a greater guarantee of coherency.

F. Store and Retrieve Attributes

Figure 13:
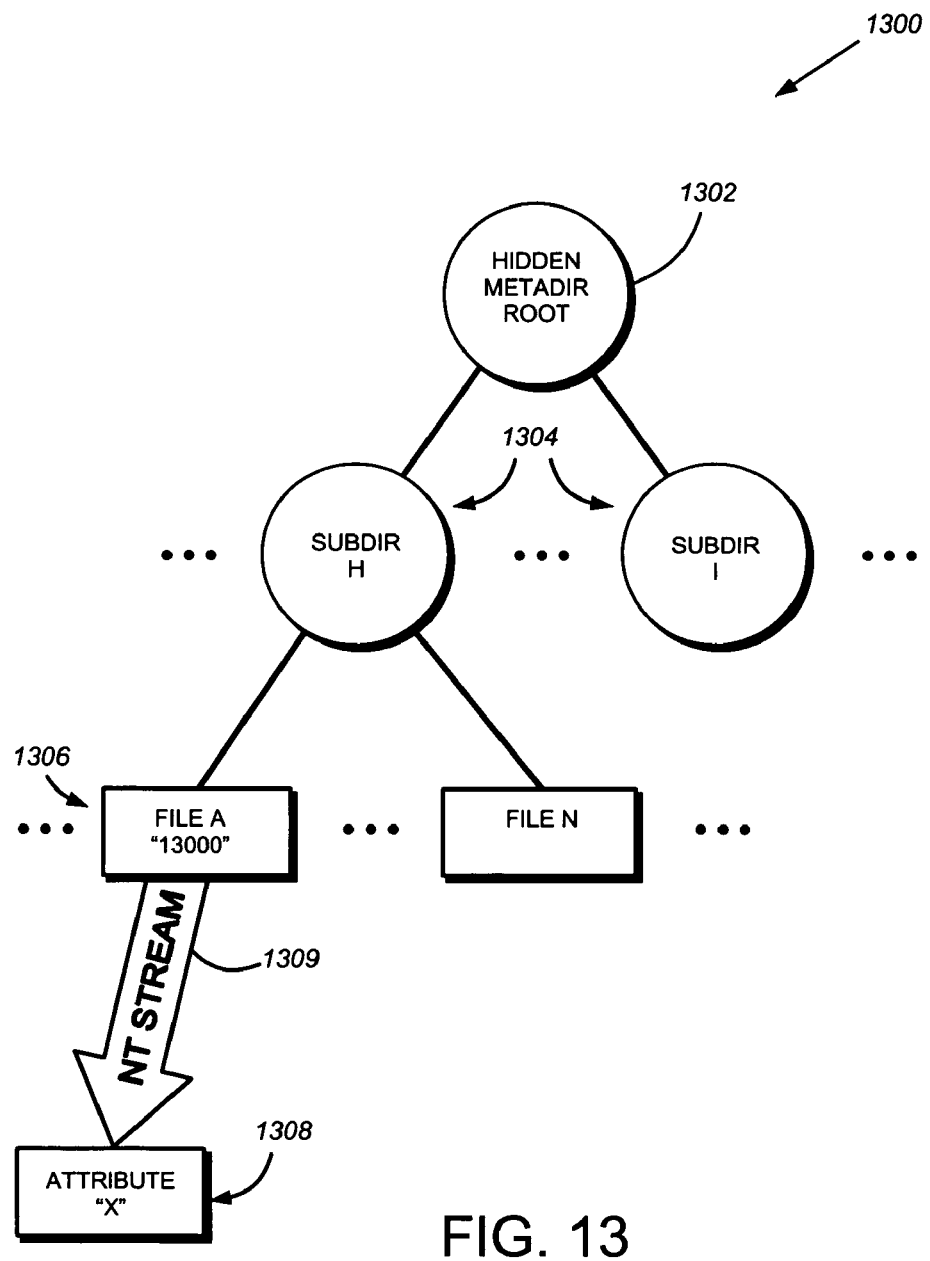
FIG. 13 is a schematic diagram of a hidden permanent metadirectory tree structure for storing extended attributes in association with files on the destination.

The system/platform-specific attributes transmitted by the source, and identified by the above-described data following header as extended attributes must be appropriately handled and acted upon by the destination file system. As noted above, attributes should be stored on the destination so as to be intact when restored to the source, but remain appropriately hidden on the destination store. In accordance with an illustrative embodiment, a hidden metadata directory ("metadir") 1300 is created as shown in FIG. 13. The hidden metadir contains a root 1302 and a plurality of subdirectories (H-I) 1304. Appended from each subdirectory are a predetermined number of files or data sets (A-N) 1306. When a file is received from the source (for example file #13000) the destination enters it into the appropriate subdirectory (H). When extended attribute information ("X") is received, the destination identifies it and associates it with file 13000. It assigned to an appended hidden attribute block 1308 that is pointed-to by the file block 13000. In an illustrative embodiment, the appending of the attribute is accomplished using an NT stream 1309 associated with the file. More information on the use of NT streams can be found in *Inside the Windows NT File System* by Helen Custer, Microsoft Press, 1994. Hence, this NT stream-appended attribute remains permanently associated with the file and follows it if and when restoration of the file to the source is requested.

If, at a subsequent time after the initial file 13000 is created with attribute X, a new version is received at the destination, the destination then subsequently determines that changed blocks are present in connection with file 13000 (and possibly many other files) based upon a scan for changed blocks in a manner described generally in, for example, the above-incorporated SYSTEM AND METHOD FOR DETERMINING CHANGES IN TWO SNAPSHOTS AND FOR TRANSMITTING CHANGES TO A DESTINATION SNAPSHOT. If, for example, the change in 13000 is a change in attribute (a new ACL, etc. denoted on the received extended attribute header) from "X" to "Y", then the hidden directory must be updated to reflect this change.

Figure 14:
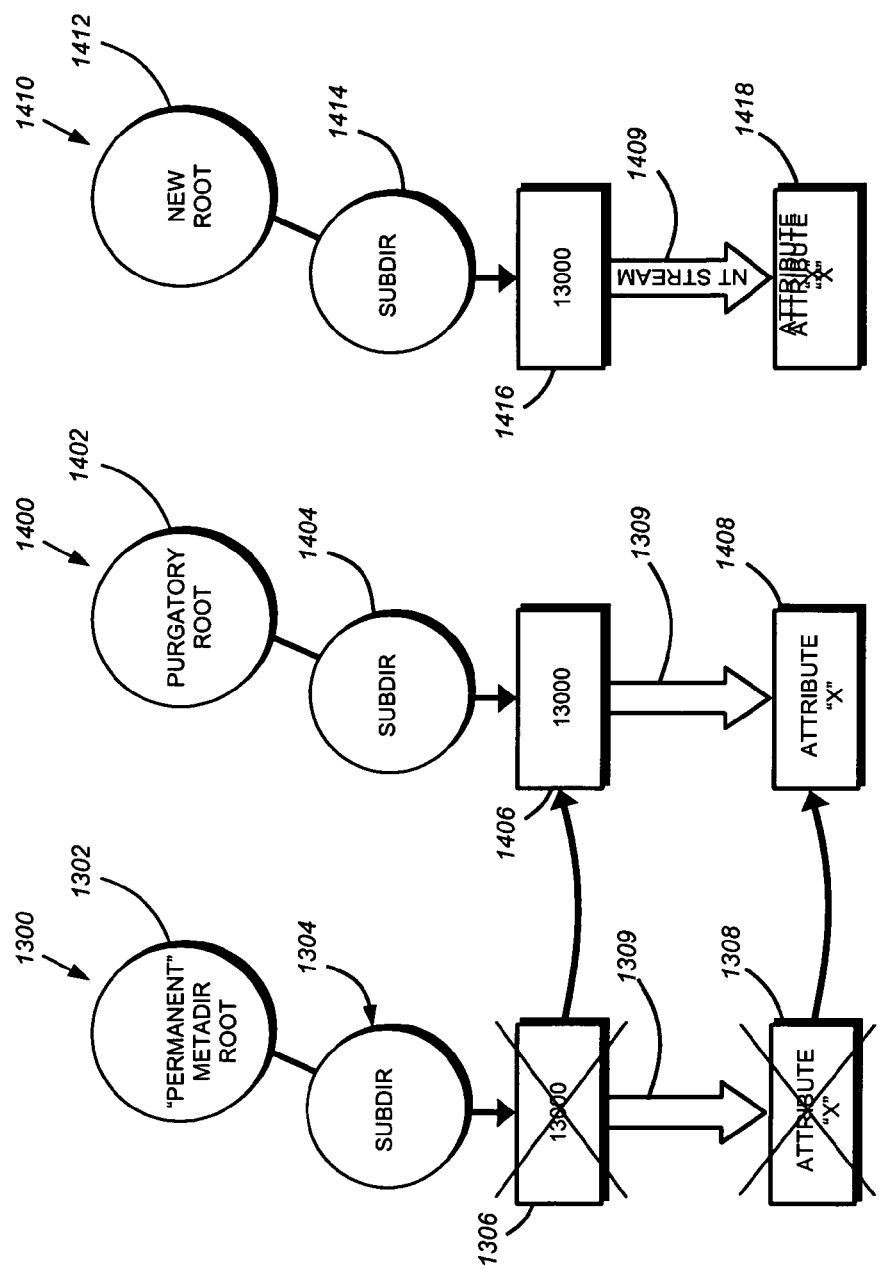
FIG. 14 is a schematic diagram of the hidden permanent metadirectory tree structure of FIG. 13 showing the creation of a hidden purgatory metadirectory and a hidden new metadirectory in response to receipt of changed files from the source.

Referring to FIG. 14, the original hidden metadir 1300 is shown with the entry of file 13000 (1306) and the NT stream 1309 containing the original attribute X. Based upon arrival of a new extended attribute "Y" for file 13000, a new "purgatory" hidden metadir 1400 is created. This purgatory metadir mirrors the original metadir 1300, which can also be termed the "permanent" metadir as it is the primary directory from which restoration of hidden attributes is sought. The purgatory metadir contains a root 1402 and subdirectories 1404 that organize the files in the same manner as the permanent metadir. As shown in FIG. 14, the file 13000 (and all other changed files) along with its original attribute X is moved to the purgatory metadir for safe keeping (see 1406 and 1408, respectively). These entries become empty on the permanent metadir 1300.

In FIG. 14, a new hidden metadir 1410 is also created. This new metadir, containing new root 1412 and subdirectories 1414 similar in organization to the permanent and purgatory directories 1300 and 1400, respectively. In this new metadir, a copy of file 13000 (1416) is placed along with the new appended attribute "Y" (1418) via an NT stream 1409.

Figure 15:
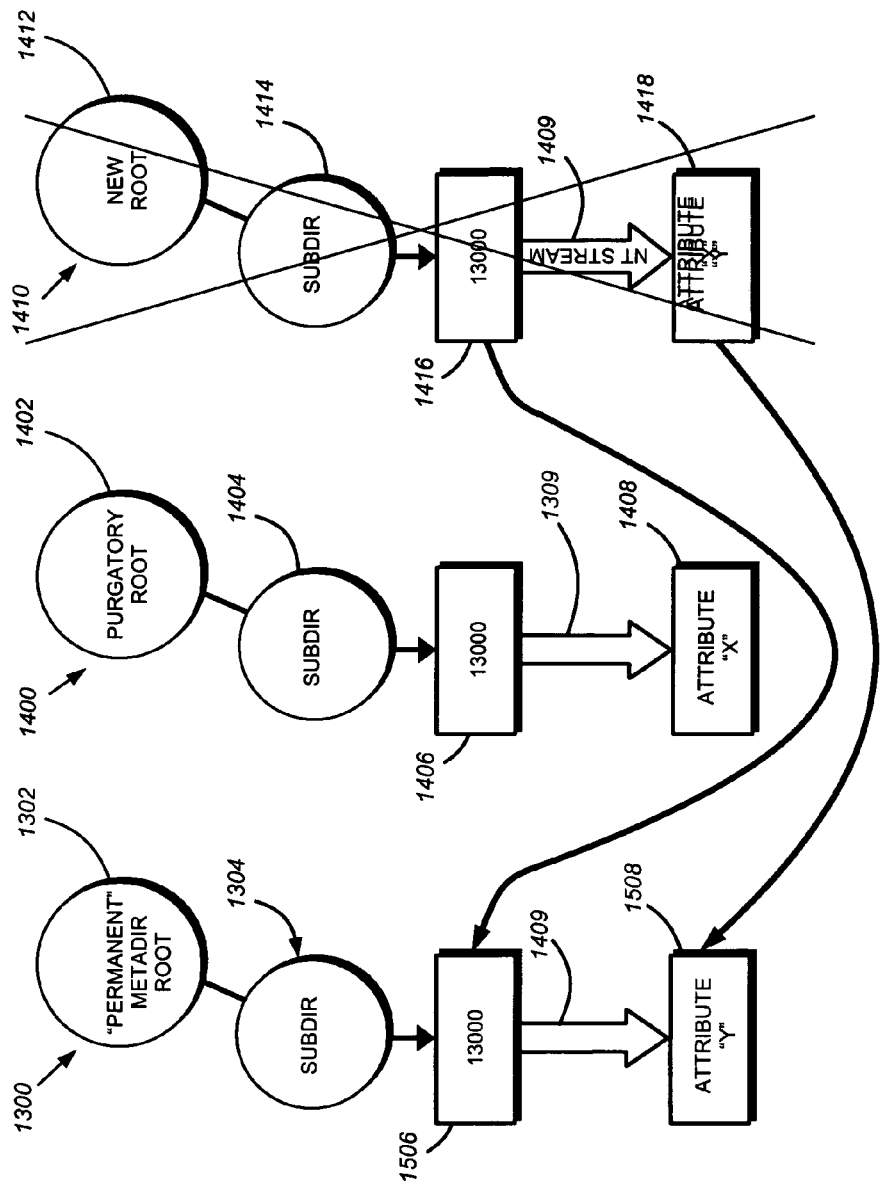
FIG. 15 is a schematic diagram of the repopulation of the hidden permanent metadirectory tree structure of FIG. 13 with changed files from the hidden new metadirectory in response to a completed receipt of files with changes from the source.

As shown in FIG. 15, having received all expected file information needed to populate the new metadir 1410, the new metadir is then emptied by transferring the copy of file 13000 and its new appended attribute "Y" (and all other changed files) back to the permanent metadir 13000 (see 1506 and 1508). When the new metadir is completely emptied, it is removed as shown.

Figure 16:
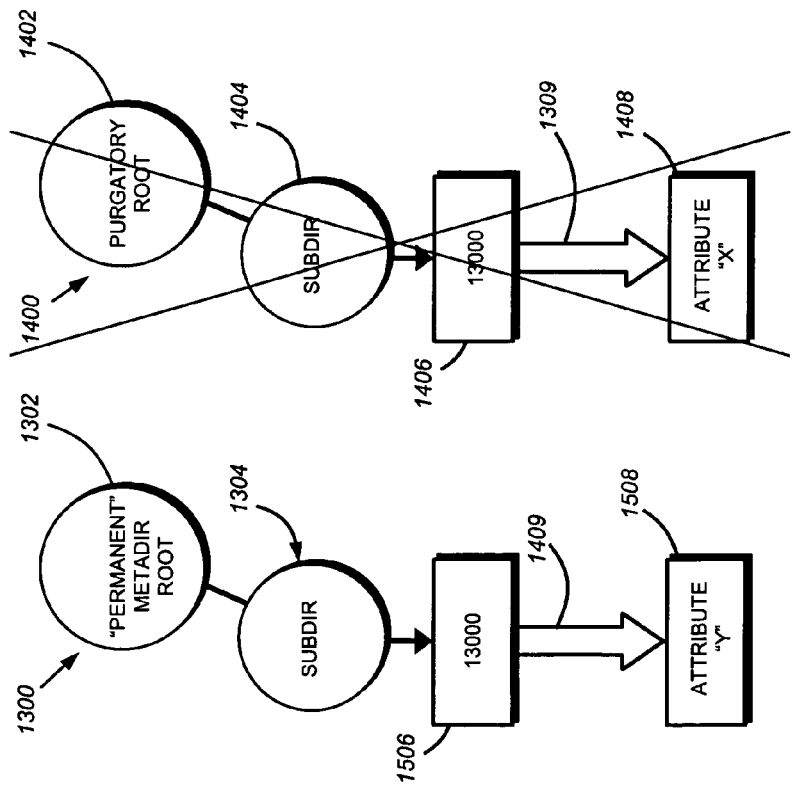
FIG. 16 is a schematic diagram of the deletion of the purgatory directory following the successful repopulation of the hidden permanent metadirectory with changed files from the hidden new metadirectory.
Figure 17:
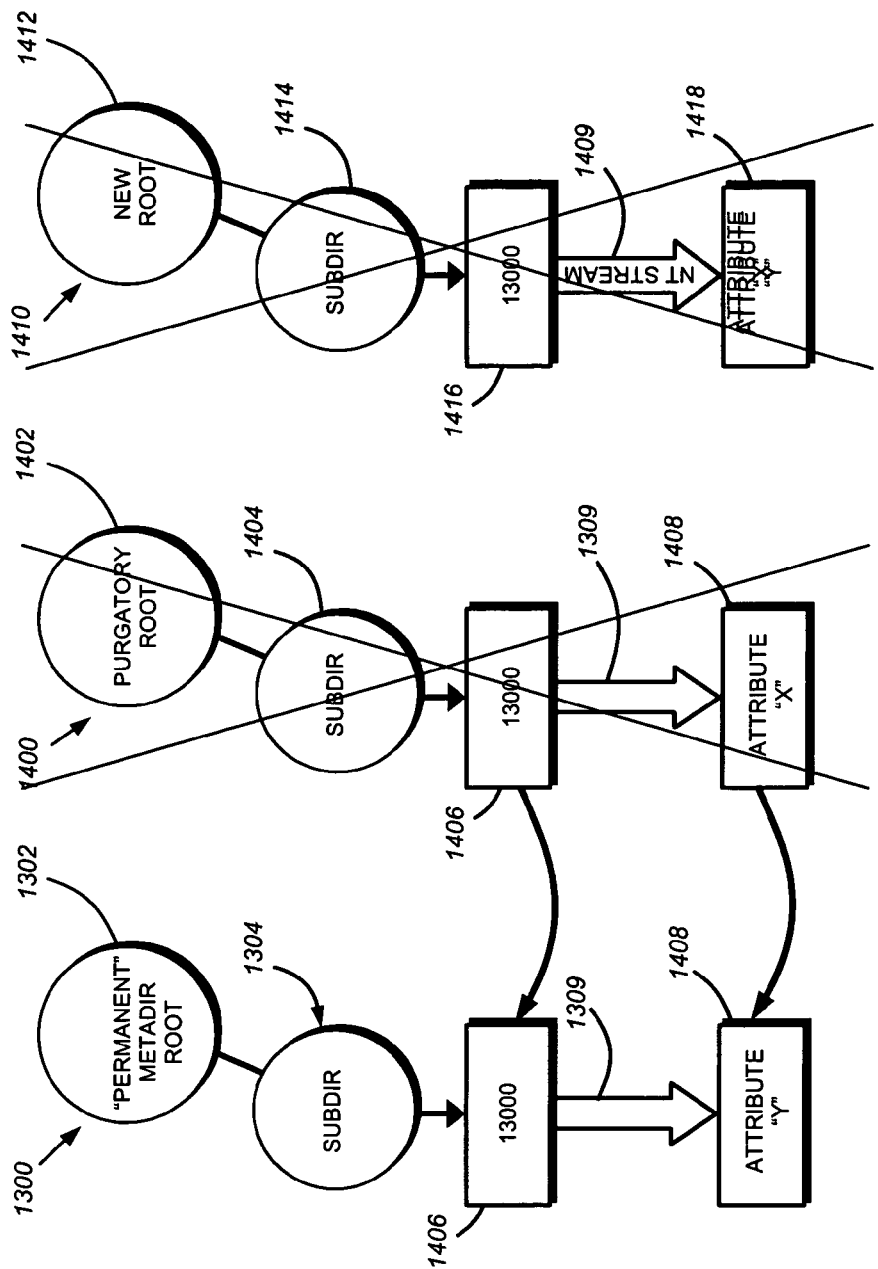
FIG. 17 is a schematic diagram of the repopulation of the hidden permanent metadirectory tree structure of FIG. 13 with original files from the hidden purgatory metadirectory in response to a an incomplete update of the hidden new metadirectory with of changed files from the source.

Referring to FIG. 16, once the new metadir is repopulated from the new metadir with all changes, the purgatory metadir is no longer needed and is deleted as shown. However, if, during the transmission of new changes, the process fails to complete (for example, a system crash, software error or network malfunction), then, as shown in FIG. 17, the permanent metadir 1300 becomes repopulated by files from the purgatory metadir 1400, including file 13000 and its original NT stream-appended attribute X (see 1406 and 1408). This can be termed a "rollback" operation. Note that this roll back is separate from the more general roll back operations performed by the destination file system as described in the various incorporated applications herein. Once the permanent metadir 1300 is repopulated, the purgatory directory is cleared and is removed as shown. Likewise, the incomplete new metadir 1410 is deleted as shown. Hence, by use of three directory trees, the management and storage of extended attributes is enabled.

Whenever a file is restored (example file 13000) for transmission to the source, the mirroring process resident on the destination performs a lookup of the hidden permanent metadir 1300. Since the metadir is organized according to file number, it is easily and quickly traversed and any pertinent information on the restored file is retrieved. In this case, the destination finds attribute X or Y on an NT stream associated with the file 13000. This stream is retrieved and transmitted back with the file using the same extended attribute header structure as used to originally transmit the attribute information from the source to the destination.

It should be clear that the format and attribute handling methods described herein effectively enable cross-platform transmission and storage of files or other data sets containing platform specific information. Even if the information is meaningless to the destination, it is stored in a hidden manner (if possible) and restored to the source when needed with no loss of content or meaning.

The foregoing has been a detailed description of embodiments of the invention. Various modifications and additions can be made without departing from the spirit and scope thereof. For example, while files and directories are denoted herein, the data can be organized around a variety of data structures and the terms "file," "file system," "directory" and the like should be taken broadly to include a variety of "data structures," "data sets," or "data organizations." Likewise, while the disk storage layers utilizes a RAID organization, it is contemplated that a variety of storage arrangements can be employed. Similarly, while the storage devices described herein are disks, the principles of this invention can be applied to a variety of storage devices or media including, but not limited to, electro-optical, solid-state, magnetic, and the like. Finally, it should be understood that any and all of the principles described herein can be implemented as hardware, software that consists of a computer readable medium executing program instructions on a computer, or a combination of hardware and software. Accordingly, this description is meant to be taken only by way of example, and not to otherwise limit the scope of this invention.

What is claimed is:

1. A system to move data from a source system to a destination system, comprising:
    the source system in communication with the destination system, the source system having a replication agent executing thereon, the replication agent adapted to generate a data stream, the data stream including:
    a plurality of standalone headers, each of the plurality of standalone headers being representative of a plurality of a data stream characteristics;
    a data following header, the data following header including an extended attribute field that associates an extended attribute with a data set information;
    the destination system adapted to receive the data following header with the extended attribute; and
    an entry in a hidden permanent metadirectory of the destination system to store the data set information associated with the extended attribute, the entry having the extended attribute associated therewith so that retrieval of the entry from the hidden permanent metadirectory also retrieves the extended attribute.

2. The system of claim 1, further comprising:
    the plurality of standalone headers each include an indication of one of a plurality of specialized header types and at least some of the plurality of specialized header types are adapted for carrying directory inode data.

3. The system of claim 1, further comprising:
    the data stream is adapted to carry source file system inode data and source file generation numbers.

4. The system of claim 1, further comprising:
    one of the standalone headers is a deleted files type and the directory inode data includes a list of deleted files on the source file system.

5. The system of claim 1, further comprising:
    the extended attributes include access control lists (ACLs) and streams associated with a plurality of operating systems and system architectures.

6. The system of claim 1, further comprising:
    one of the plurality of standalone headers includes an open file/undo header that instructs the destination system to revert to an earlier copy of a stored file identified by the open file/undo header.

7. The system of claim 1, further comprising:
    the data set information includes file information.

8. The system of 1, further comprising:
    the data set information includes changed files on the source system transmitted for backup on the replica of the destination system.

9. The system of claim 1, further comprising:
    the data following header includes offset and block number information with respect to the data set information that follows the data following header.

10. The system of claim 1, further comprising:
    the data following header includes a fixed-length record including (A) a generic part for storing an indication of a data following header type; (B) a non-generic part, adapted to carry predetermined data related to the extended attribute and data related to offsets and block numbers for the data set information that follows the data following header; and (C) a space for a bit-code representative of a name associated with the extended attribute.

11. The system of claim 1, further comprising:
    each of the plurality of standalone headers includes a fixed-length record including a generic part for storing an indication of one of a plurality of specialized header types, a non-generic part, adapted to carry predetermined data related one of the specialized header types and a space for additional information.

12. The system of claim 1, further comprising:
    the data following header is adapted to be positioned within the data stream at predetermined intervals that are up to approximately 2 MB of data set information in size.

13. The system of claim 1, further comprising:
    the destination system includes a hidden purgatory metadirectory in which current data set information from the hidden permanent metadirectory is stored during an update of the hidden permanent metadirectory with changed data set information, the destination system being further adapted to (A) delete the hidden purgatory metadirectory after a complete receipt of all expected changed data set information of the hidden permanent metadirectory with the changed data set information, and (B) move current data set information stored on the hidden purgatory metadirectory back to the hidden permanent metadirectory after an incomplete receipt of all expected changed data set information.

14. The system of claim 13, further comprising:
    the destination system is adapted to create a hidden new metadirectory to store changed data set information for transfer to the hidden permanent metadirectory after of the complete receipt of all the expected changed data set information.

15. The system of claim 1, further comprising:
    the source system and the destination system are remote with respect to each other and interconnected by a network, and wherein the data stream is encapsulated within a networking protocol adapted for transmission over the network.

16. A system for transmitting a data stream that includes data set information, the system comprising:

a destination system having a replica stored thereon;

a source system having a replication agent executing thereon, the replication agent adapted to generate the data stream, the data stream having a data following header appended to a predetermined-sized chunk of data, the data following header including a field that identifies extended attributes associated with data set information carried in the chunk; and the destination system, in response to the data following header, storing the chunk of data as an entry in a hidden permanent metadirectory in a file system of the destination system, the entry having the extended attribute associated therewith so that retrieval of the entry from the hidden permanent metadirectory also retrieves the extended attribute.

17. The system of claim 16, further comprising:
the extended attributes include access control lists (ACLs) and streams associated with a plurality of operating systems and system architectures.

18. The system of claim 16, further comprising:
the data set information includes file information.

19. The system of claim 16, further comprising:
the data set information includes changed files on the source system transmitted for backup on the replica of the destination system.

20. The system of claim 16, further comprising:
the data following header includes offset and block number information with respect to the data set information that follows the data following header.

21. The system of claim 16, further comprising:
the data following header includes a fixed-length record including (A) a generic part for storing an indication of a data following header type; (B) a non-generic part, adapted to carry predetermined data related to the extended attribute and data related to offsets and block numbers for the data set information that follows the data following header; and (C) a space for a bit-code representative of a name associated with the extended attribute.

22. The system of claim 16, further comprising:
the chunk has a size of up to approximately 2 MB of data set information.

23. The system of claim 16, further comprising:
the destination system is adapted to receive the data following header with the extended attribute and cause the data set information associated with the extended attribute to be stored in an entry in a hidden permanent metadirectory with identifiers that are the same as identifiers for the data set information in a file system of the destination system, the entry having the extended attribute associated therewith so that retrieval of the entry from the hidden permanent metadirectory also retrieves the extended attribute.

24. The system of claim 23, further comprising:
the destination system includes a hidden purgatory metadirectory in which current data set information from the hidden permanent directory is stored during an update of the hidden permanent metadirectory with changed data set information, the destination system being further adapted to (A) delete the hidden purgatory metadirectory after a complete receipt of all expected changed data set information of the hidden permanent metadirectory with the changed data set information, and (B) move current data set information stored on the hidden purgatory metadirectory back to the hidden permanent metadirectory after an incomplete receipt of all expected changed data set information.

25. The system of claim 24, further comprising:
the destination system is adapted to create a hidden new metadirectory to store changed data set information for transfer to the hidden permanent metadirectory after of the complete receipt of all the expected changed data set information.

26. A method for storing and retrieving extended attributes associated with a data set information comprising:

executing a replication agent on a source system, the replication agent adapted to generate a data stream, the data stream having;

a plurality of standalone headers, each of the plurality of standalone headers being representative of a plurality of data stream characteristics;

a data following header, the data following header including an extended attribute field that associates an extended attribute with a chunk of data preceding the data following header;

receiving the data stream by a destination system;

storing in a destination system, in response to receiving the data stream, a current data set information with current extended attributes in a permanent hidden metadirectory;

transferring the data set information to a purgatory metadirectory upon receipt of a changed data set information;

storing the received changed data set information in a new metadirectory; and upon completion of receipt of all expected changed data set information, transferring the received changed data set information from the new metadirectory to the permanent metadirectory, the permanent metadirectory thereby being available for retrieval of extended attributes associated with the data set information.

27. The method of claim 26, further comprising:
upon a failure to complete receipt of all expected changed data set information, transferring the current data set information with the current extended attributes back to the permanent metadirectory.

28. The method of claim 27, further comprising:
the data set information including files organized in a directory tree structure the same as a file system structure on the destination system and the extended attributes including access control lists (ACLs) and streams associated with the files.

29. The method of claim 28, further comprising:
deleting the purgatory metadirectory after one of, either (A) the transferring of the changed data set information from the new metadirectory to the permanent metadirectory or (B) the transferring of the current data set information from the purgatory metadirectory back to the permanent metadirectory.

30. The method of claim 29, further comprising:
upon a request from the source to restore data sets from the data set information, scanning the permanent directory and retrieving the data sets including retrieving respective of the extended attributes associated with the data sets.

31. The method of claim 30, further comprising:
providing the retrieved data sets' extended attributes in a format for transmission to the source from the destination, the format including data following headers each having a field that associates the respective of the extended attributes with the retrieved data sets.

32. The method of claim 31, further comprising:
associating the respective of the extended attributes with the data sets based upon NT streams.

33. The method of claim 26, further comprising:
associating the extended attributes with the data set information in the permanent metadirectory using NT streams.

34. The method of claim 26, further comprising:
providing the data sets' extended attributes in a format for transmission to the destination from the source, the format including data following headers each having a field that associates the respective of the extended attributes with the retrieved data sets.

35. A computer readable medium for storing and retrieving extended attributes associated with a data set information, the computer readable medium including program instructions for performing the steps of:
executing a replication agent on a source system, the replication agent adapted to generate a data stream, the data stream having:
a plurality of standalone headers, each of the plurality of standalone headers being representative of a plurality of data stream characteristics;
a data following header, the data following header including an extended attribute field that associates an extended attribute with a chunk of data preceding the data following header;
receiving the data stream by a destination system;
storing in the destination system, in response to receiving the data stream, a current data set information with current extended attributes in a permanent hidden metadirectory;
transferring the data set information to a purgatory metadirectory upon receipt of a changed data set information;
storing the received changed data set information in a new metadirectory; and
upon completion of receipt of all expected changed data set information, transferring the received changed data set information from the new metadirectory to the permanent metadirectory, the permanent metadirectory thereby being available for retrieval of extended attributes associated with the data set information.

36. A system for transmitting a data stream, the system comprising:
an operating system for a destination data storage system, the operating system configured to receive the data stream and maintain a replica of a data set of the source system; having a replica residing therein;
a plurality of standalone headers in the data stream, the plurality of standalone headers having discrete identifiers, each of the plurality of standalone headers being representative of a plurality of data stream characteristics;
a data following header in the data stream, the data following header having an extended attribute field that associates an extended attribute with the data in the data stream, the extended attribute including metadata external to the data set; and
the destination system, in response to the data following header, storing the data set information associated with the extended attribute as an entry in a hidden permanent metadirectory with identifiers that are the same as identifiers for the data set information in a file system of the destination system, the entry having the extended attribute associated therewith so that retrieval of the entry from the hidden permanent metadirectory also retrieves the extended attribute.

37. A method for backing up data from a source to a destination data storage system, the method comprising:
formatting, by the source, a data stream including system specific attributes by appending to the data stream a plurality of standalone headers and a plurality of data following headers:
the standalone headers including information which characterize data in the data stream;
the data following headers including at least one extended attribute which identifies a system specific attribute of data in the data stream;
communicating the formatted data stream from the source to the destination data storage system; and
storing, by the destination system, the data with the system specific attribute as an entry in a hidden permanent metadirectory with identifiers that are the same as identifiers for the data in a file system of the destination system, the entry having the system specific attribute associated therewith so that retrieval of the entry from the hidden permanent metadirectory also retrieves the system specific attribute.

38. The method of claim 37, further comprising:
interpreting the information, by the destination data storage system, as instructions for handling data in the data stream according to the system specific attribute if the system specific attribute is compatible with the destination data storage system; and
interpreting the information, by the destination data storage system, as instructions for ignoring the system specific attribute if the system specific attribute is incompatible with the destination data storage system.

39. The method of claim 37, further comprising:
including space in the data following header for the extended attributes to store self-descriptive information.

40. A method for storing data in a destination system, the data obtained from a source system, comprising:
executing a replication agent on the source system, the replication agent adapted to generate a data stream, the data stream having, a plurality of standalone headers and a data following header, the data following header including an extended attribute field that associates an extended attribute with a chunk of data associated with the data following header;
receiving the data stream by the destination system;
storing in the destination system, in response to receiving the data stream, the chunk of data associated with the data following header as an entry in a hidden metadirectory; and
retrieving the chunk of data from the hidden metadirectory so that retrieval of the entry from the hidden metadirectory also retrieves the extended attribute.

41. The method of claim 40, further comprising:
transferring the chunk of data to a purgatory metadirectory upon receipt of a changed chunk of data;
storing the received changed chunk of data in a new metadirectory;
storing additional changed chunks of data in the new metadirectory; and
upon completion of receipt of all expected additional changed chunks of data, transferring the received changed chunks of data from the new metadirectory to a permanent metadirectory, the permanent metadirectory then being available for retrieval of extended attributes associated with the received changed chunks of data.

42. The method of claim 40, further comprising:
including in the standalone headers a deleted files type, and the data including a list of deleted files on the source system.

43. The method of claim 40, further comprising:
including access control lists (ACLs), streams associated with a plurality of operating systems, and system architectures in the extended attributes.

44. The method of claim 40, further comprising:
including as one of the standalone headers an open file/undo header that instructs the destination system to revert to an earlier copy of a stored file identified by the open file/undo header.

45. The method of claim 40, further comprising:
including changed files on the source system, the changed files transmitted for backup on the replica.

46. The method of claim 40, further comprising:
including offset and block number information in a header for a data set that follows the header.

47. The method of claim 40, further comprising:
including in the data following header a record having (A) a generic part for storing an indication of a data following header type; (B) a non-generic part, adapted to carry predetermined data related to the extended attribute and data related to offsets and block numbers for a data set information that follows the data following header; and (C) a space for a bit-code representative of a name associated with the extended attribute.

48. The method of claim 40, further comprising:
including in at least one of the plurality of standalone headers a fixed-length record including a generic part for storing an indication of one of a plurality of specialized header types, a non-generic part, adapted to carry predetermined data related one of the specialized header types and a space for additional information.

49. The method of claim 40, further comprising:
adapting the data following header to be positioned within the data stream at pre-determined intervals that are up to approximately 2 MB of data set information in size.

50. The method of claim 40, further comprising:
including in the destination system a hidden purgatory metadirectory in which current data set information from the hidden permanent metadirectory is stored during an update of the hidden permanent metadirectory with changed data set information, the destination system being further adapted to (A) delete the hidden purgatory metadirectory after a complete receipt of all expected changed data set information of the hidden permanent metadirectory with the changed data set information, and (B) move current data set information stored on the hidden purgatory metadirectory back to the hidden permanent metadirectory after an incomplete receipt of all expected changed data set information.

51. The method of claim 40, further comprising:
adapting the destination system to create a hidden new metadirectory to store changed data set information for transfer to the hidden permanent metadirectory after receipt of all the expected changed data set information.

52. The method of claim 40, further comprising:
interconnecting the source system and the destination system by a computer network, and the data stream is encapsulated within a networking protocol adapted for transmission over the network.

53. The method of claim 40, further comprising:
carrying source file system inode data and source file generation numbers in the data stream.

54. A system to store data in a destination system, the data obtained from a source system, comprising:
a replication agent to execute on the source system, the replication agent adapted to generate a data stream, the data stream having, a plurality of standalone headers and a data following header, the data following header including an extended attribute field that associates an extended attribute with a chunk of data associated with the data following header;
a port to receive the data stream by the destination system;
an entry in a hidden metadirectory in the destination system to store, in response to receiving the data stream, the chunk of data associated with the data following header; and
retrieving the chunk of data from the hidden metadirectory so that retrieval of the entry from the hidden metadirectory also retrieves the extended attribute.

55. The system of claim 54, further comprising:
transferring the chunk of data to a purgatory metadirectory upon receipt of a changed chunk of data;
storing the received changed chunk of data in a new metadirectory;
storing additional changed chunks of data in the new metadirectory; and
upon completion of receipt of all expected additional changed chunks of data, transferring the received changed chunks of data from the new metadirectory to a permanent metadirectory, the permanent metadirectory then being available for retrieval of extended attributes associated with the received changed chunks of data.

56. The system of claim 54, further comprising:
a deleted files type included in the standalone header, and the data including a list of deleted files on the source system.

57. The system of claim 54, further comprising:
access control lists (ACLs), streams associated with a plurality of operating systems, and system architectures included in the extended attributes.

58. The system of claim 54, further comprising:
an open file/undo header that instructs the destination system to revert to an earlier copy of a stored file identified by the open file/undo header included as one of the standalone headers.

59. The system of claim 54, further comprising:
changed files on the source system, the changed files transmitted for backup on the replica.

60. The system of claim 54, further comprising:
offset and block number information in included in a header for a data set that follows the header.

61. The system of claim 54, further comprising:
a record having (A) a generic part for storing an indication of a data following header type; (B) a non-generic part, adapted to carry predetermined data related to the extended attribute and data related to offsets and block numbers for a data set information that follows the data following header; and (C) a space for a bit-code representative of a name associated with the extended attribute included in the data following header.

62. The system of claim 54, further comprising:
a fixed-length record including a generic part for storing an indication of one of a plurality of specialized header types, a non-generic part, adapted to carry predetermined data related one of the specialized header types, and a space for additional information included in at least one of the plurality of standalone headers.

63. The system of claim 54, further comprising:

a processor to position the data following header to be positioned within the data stream at predetermined intervals that are up to approximately 2 MB of data set information in size.

64. The system of claim 54, further comprising:

a hidden purgatory metadirectory included in the destination system, the hidden purgatory metadirectory storing current data set information from the hidden permanent metadirectory during an update of the hidden permanent metadirectory with changed data set information, the destination system being further adapted to (A) delete the hidden purgatory metadirectory after a complete receipt of all expected changed data set information of the hidden permanent metadirectory with the changed data set information, and (B) move current data set information stored on the hidden purgatory metadirectory back to the hidden permanent metadirectory after an incomplete receipt of all expected changed data set information.

65. The system of claim 54, further comprising:

a hidden new metadirectory created in the destination system to store changed data set information for transfer to the hidden permanent metadirectory after receipt of all the expected changed data set information.

66. The system of claim 54, further comprising:

a computer network to interconnect the source system and the destination system, and the data stream is encapsulated within a networking protocol adapted for transmission over the network.

67. The system of claim 54, further comprising:

source file system inode data and source file generation numbers carried in the data stream.

68. A computer readable media, comprising:

said computer readable media containing instructions for execution on a processor for a method of storing data in a destination system, the data obtained from a source system, the method having the steps of:

executing a replication agent on the source system, the replication agent adapted to generate a data stream, the data stream having, a plurality of standalone headers and a data following header, the data following header including an extended attribute field that associates an extended attribute with a chunk of data associated with the data following header;

receiving the data stream by the destination system;

storing in the destination system, in response to receiving the data stream, the chunk of data associated with the data following header as an entry in a hidden metadirectory; and retrieving the chunk of data from the hidden metadirectory so that retrieval of the entry from the hidden metadirectory also retrieves the extended attribute.

\* \* \* \* \*

UNITED STATES PATENT AND TRADEMARK OFFICE
CERTIFICATE OF CORRECTION

| | | |
|---|---|---|
| PATENT NO. | : 7,478,101 B1 | Page 1 of 1 |
| APPLICATION NO. | : 10/777978 | |
| DATED | : January 13, 2009 | |
| INVENTOR(S) | : Stephen L. Manley | |

It is certified that error appears in the above-identified patent and that said Letters Patent is hereby corrected as shown below:

In Col. 14, line 56:
the data stream of information over the network 618 that is In Col. 16, line 22:
1-KB part 1006 is unused (available for later expansion), or in In Col. 19, line 58:
tion identifies it and associates it with file 13000. It is assigned Signed and Sealed this
Eighth Day of May, 2012

David J. Kappos
*Director of the United States Patent and Trademark Office*